US007684736B2

(12) United States Patent
Sugizaki

(10) Patent No.: US 7,684,736 B2
(45) Date of Patent: Mar. 23, 2010

(54) IMAGE FORMING METHOD, SCREEN SET AND IMAGE FORMING APPARATUS

(75) Inventor: Makoto Sugizaki, Sagamihara (JP)

(73) Assignee: FUJIFILM Corporation, Tokyo (JP)

( * ) Notice: Subject to any disclaimer, the term of this patent is extended or adjusted under 35 U.S.C. 154(b) by 416 days.

(21) Appl. No.: 11/883,225

(22) PCT Filed: Jan. 25, 2006

(86) PCT No.: PCT/JP2006/301161

§ 371 (c)(1),
(2), (4) Date: Jul. 27, 2007

(87) PCT Pub. No.: WO2006/112102

PCT Pub. Date: Oct. 26, 2006

(65) Prior Publication Data

US 2008/0213681 A1 Sep. 4, 2008

(30) Foreign Application Priority Data

Mar. 31, 2005 (JP) ............................ 2005-103365
Nov. 8, 2005 (JP) ............................ 2005-324170

(51) Int. Cl.
*G03G 15/01* (2006.01)

(52) U.S. Cl. ......................... 399/180; 399/181; 358/1.2

(58) Field of Classification Search ................. 399/130, 399/177–181; 358/1.2, 3.17, 3.21, 3.24, 358/505

See application file for complete search history.

(56) References Cited

U.S. PATENT DOCUMENTS

| | | | | |
|---|---|---|---|---|
| 5,583,660 | A * | 12/1996 | Rylander | 358/3.17 |
| 7,486,413 | B2 * | 2/2009 | Eliav et al. | 358/1.2 |
| 2002/0085249 | A1 | 7/2002 | Tsuda et al. | |
| 2002/0186417 | A1 | 12/2002 | Inoue | |
| 2002/0196310 | A1 | 12/2002 | Inoue | |

FOREIGN PATENT DOCUMENTS

| | | | |
|---|---|---|---|
| JP | 2000-50071 | A | 2/2000 |
| JP | 2002-112047 | A | 4/2002 |
| JP | 2002-369005 | A | 12/2002 |
| JP | 2002-369017 | A | 12/2002 |

* cited by examiner

*Primary Examiner*—Hoan H Tran
(74) *Attorney, Agent, or Firm*—Sughrue Mion, PLLC

(57) ABSTRACT

An image forming apparatus for forming a color image of CMK color plates by electrophotography system in which a K color plate having highest visibility among CMYK colors is composed of a rational number mesh. Profile of halftone dots (201Kh) becomes constant substantially and the factor for generating streak and unevenness is suppressed. Furthermore, C color plate and M color plate are formed of super cells and the K color plate, C color plate and M color plate are formed at an interval of 30°. Consequently, a Rosetta formed of halftone dots (201Ch, 201Mh, 201Kh) of CMK is optimized and the factor for generating moiré component is suppressed.

10 Claims, 34 Drawing Sheets

FIG. 18A

| | | | | | | | | | |
|---|---|---|---|---|---|---|---|---|---|
| M | M | | | | | | C | B | M |
| M | R | Y | Y | | | Y | Gn | Gy | B |
| | Gn | Gn | Y | | | Y | Y | Y | |
| | Gn | Gn | Gn | | | Y | Y | Y | |
| | | | | M | M | | | | |
| | | | | M | M | | C | C | |
| | Y | Y | Y | | | Y | Gn | Gn | C |
| | Gn | | | | | Y | Y | Y | |
| M | Gn | | | | | Y | Y | R | M |
| M | M | | | | | | | M | M |

FIG. 18B

| COLOR | COLOR RATIO (%) |
|---|---|
| NO PIXEL | 44 |
| Cyan | 4 |
| Mazenta | 14 |
| Yellow | 20 |
| Red | 2 |
| Green | 12 |
| Blue | 2 |
| Gray | 2 |

FIG. 19A

| | | | | | | | | | |
|---|---|---|---|---|---|---|---|---|---|
| | | | | | | | | | |
| | Y | Y | Y | | | Y | Gn | Gn | |
| M | R | Y | Y | | | Y | Gn | Gy | B |
| M | Gy | Gn | Y | | | Y | Y | R | M |
| | C | C | C | | | | | | |
| | | | | | | | | | |
| | Y | Y | Y | M | M | Y | Gn | Gn | |
| | Y | Y | Y | M | M | Y | Gn | Gn | C |
| | Gn | Gn | Y | | | Y | Y | Y | |
| | C | C | C | | | | | | |

FIG. 19B

| COLOR | COLOR RATIO (%) |
|---|---|
| NO PIXEL | 49 |
| Cyan | 7 |
| Mazenta | 7 |
| Yellow | 22 |
| Red | 2 |
| Green | 10 |
| Blue | 1 |
| Gray | 2 |

Yellow

Cyan

Mazenta

FIG. 27

| | | n | m | Nc | SUBSTANTIAL RULING [LPI] | SUBSTANTIAL ANGLE [° ] |
|---|---|---|---|---|---|---|
| (b) | c | 27 | 8 | 255 | 265.0377 | 16.50436138 |
| | m | 19 | 21 | 255 | 266.5375 | 47.86240523 |
| | k | 2 | 9 | 85 | 260.3165 | 77.47119229 |
| (c) | c | 25 | 11 | 246 | 266.4683 | 23.74949449 |
| | m | 8 | 11 | 123 | 265.3945 | 53.97262661 |
| | k | 1 | 9 | 82 | 265.0357 | 83.65980825 |

IMAGE FORMING METHOD, SCREEN SET AND IMAGE FORMING APPARATUS

TECHNICAL FIELD

The present invention relates to an image forming method, which preferably is applied to an image forming apparatus for forming a color image with an AM screen, using a combination of C (cyan), M (magenta), Y (yellow), and K (black) plates on an electrophotographic copying machine, printer, or the like. The present invention also relates to a screen set and an image forming apparatus.

BACKGROUND ART

According to a halftoning process used in color electrophotography, it is customary to form a halftone threshold matrix (referred to simply as a threshold matrix) with a rational screen having a small halftone cell size (see Japanese Laid-Open Patent Publication No. 2002-112047, paragraph [0015]).

In the art of AM screens, assuming there are 8×8 or 16×16 pixels that can be blackened (colored), then the halftone cell size refers to the size 8×8 or 16×16. Assuming the screen angle is 0°, then the size of a threshold matrix, made up of thresholds corresponding to respective pixels, is equal to the halftone cell size. In the halftone cell, blackened (colored) areas are referred to as halftone dots.

In rational screens, (sizes of) halftone cells are identical to each other. When halftone dots are generated by comparing a continuous tone image with the threshold matrix, then the halftone dots of each halftone cell have identical sizes and shapes. In the present specification, the rational screen refers to a screen wherein, if a screen angle θ is expressed as θ=arctan(m/n) using a trigonometric arctangent where m and n are natural numbers, then the size of the threshold matrix satisfies a positive integral multiple of $m^2+n^2$.

However, since the halftone cell size (and the halftone matrix size) of rational screens is small, a rosetta pattern optimization, which has been taken into account for offset printing, cannot be performed. That is, the C, M, K plates cannot be set accurately to angles at 30° intervals, e.g., 15°, 45°, 75°, and hence moiré patterns are generated.

In order to angularly space the C, M, K plates exactly at 30° intervals, it could be possible to generate halftone dots with a supercell having a large threshold matrix size, rather than using a rational screen.

DISCLOSURE OF THE INVENTION

However, if an electrophotographic image forming apparatus employs supercell halftone dots for the C, M, K plates, then the sizes of the halftone cells of the supercell become irregular. Furthermore, if a continuous tone image having a constant density is compared with a threshold matrix in order to generate halftone dots, then the halftone dots are irregular in size and shape, with the result that toner used during the electrophotographic process may be deposited irregularly. Such toner deposition irregularities are responsible for stripes and irregular patterns in color images.

It is known in the art that electrophotographic image forming apparatuses tend to generate moiré patterns, which are caused by the use of a powdery toner having a large particle size, i.e., a so-called pile height moiré (see Japanese Laid-Open Patent Publication No. 2002-112047, paragraph [0021]).

The present invention has been made in view of the above problems. An object of the present invention is to provide an image forming method, which is capable of minimizing the factors responsible for moiré patterns as well as the factors responsible for stripes and irregular patterns, in an electrophotographic image forming apparatus, a screen set, and an image forming apparatus.

According to the present invention, an image forming method for forming a color image with at least C, M, K plates according to an electrophotographic process comprises the steps of forming a K plate as a rational screen, wherein assuming a screen angle θ is expressed as θ=arctan(m/n) where m and n are natural numbers, then the size of a threshold matrix satisfies a positive integral multiple of $m^2+n^2$, forming C and M plates as supercells, and spacing respective screen angles of the K plate, the C plate, and the M plate at respective intervals of 30° (central value).

According to the present invention, a screen set for use in forming a color image with at least C, M, K plates according to an electrophotographic process comprises a K plate formed as a rational screen, wherein assuming a screen angle θ is expressed as θ=arctan(m/n) where m and n are natural numbers, then the size of a threshold matrix satisfies a positive integral multiple of $m^2+n^2$, and C and M plates formed as supercells, wherein respective screen angles of the K plate, the C plate, and the M plate are spaced at respective intervals of 30°.

According to the present invention, an image forming apparatus for forming a color image with at least C, M, K plates according to an electrophotographic process comprises a K plate formed as a rational screen, wherein assuming a screen angle θ is expressed as θ=arctan(m/n) where m and n are natural numbers, then the size of a threshold matrix satisfies a positive integral multiple of $m^2+n^2$, and C and M plates formed as supercells, wherein respective screen angles of the K plate, the C plate, and the M plate are spaced at respective intervals of 30°.

In the image forming method, the screen set, and the image forming apparatus described above, among the C, M, K plates, the K plate, which is of the highest visibility, is formed as a rational screen, in order to keep the halftone dots constant in shape, and to reduce the factors responsible for stripes and irregularities. The C and M plates are formed as supercells, wherein the respective screen angles of the K plate, the C plate and the M plate are spaced at respective intervals of 30° (central value/set value), so as to optimize rosetta patterns and to reduce the factors responsible for forming moiré patterns.

In the image forming apparatus, since irregular components occur frequently in the scanning direction, halftone dots at screen angles of 0° and 45° tend to interfere with the scanning direction of the image forming apparatus, and tend to make irregularities more noticeable. If the screen angle of the K plate comprises an angle other than 0° or 45°, then such irregular components of the image forming apparatus are not emphasized.

With a higher ruling, e.g., a ruling of 200 [LPI] at an output resolution of 2400 [DPI], the dots become smaller and are applied unstably. In order to enlarge the dots, it is preferable that the value produced by dividing an output resolution by the ruling, for each of the C, M, K plates, be smaller than 12.

For reducing a shift that occurs when the halftone dots of the plates overlap each other, i.e., for reducing a color shift (color difference) with respect to a registration shift, or stated otherwise, for increasing color shift intensity with respect to the registration shift, i.e., for increasing so-called robustness, the size of the threshold matrix of the K plate should preferably be equal to or greater than 80×80. Taking into account the capacity of the memory that stores the threshold matrix, the size of the threshold matrix of the K plate should preferably be equal to or smaller than 256×256.

If a Y plate is added to the C, M, K plates in order to form color images using the C, M, Y, K plates, then the Y plate is formed as the same rational screen as the K plate, while being shifted in phase from the K plate. In this manner, since an overlap of the halftone dots of the Y and K plates is reduced, moiré patterns caused by use of a powdery toner having a large particle size, (i.e., a so-called pile height moiré) can be suppressed. Adjacent halftone dot cells are shifted in phase by 180° (½ the period of the halftone dot cells).

If the Y plate and the K plate are shifted in phase from each other, within a range from 150° to 210°, then the pile height moiré is suppressed.

If variations in the rulings for the respective colors are set at 10 LPI or less, then such rulings provide conditions for angularly spacing the K, C and M plates at intervals of 30°, thereby more effectively reducing the factors responsible for causing moiré patterns.

The respective screen angles of the K plate, the C plate, and the M plate should preferably be spaced at respective intervals of 30°±1.5°.

BRIEF DESCRIPTION OF THE DRAWINGS

FIG. 18A is a diagram showing an example of a halftone dot structure, which is obtained when the shift is "0";

FIG. 18B is a table showing the ratios of colors that are present on an image;

FIG. 19A is a diagram showing an example of a halftone dot structure, which is obtained when a shift occurs;

FIG. 19B is a table showing the ratios of colors that are present in an image;

FIG. 27 is a table showing an example of a screen set;

BEST MODE FOR CARRYING OUT THE INVENTION

Embodiments of the present invention shall be described below with reference to the drawings.

Figure 1:
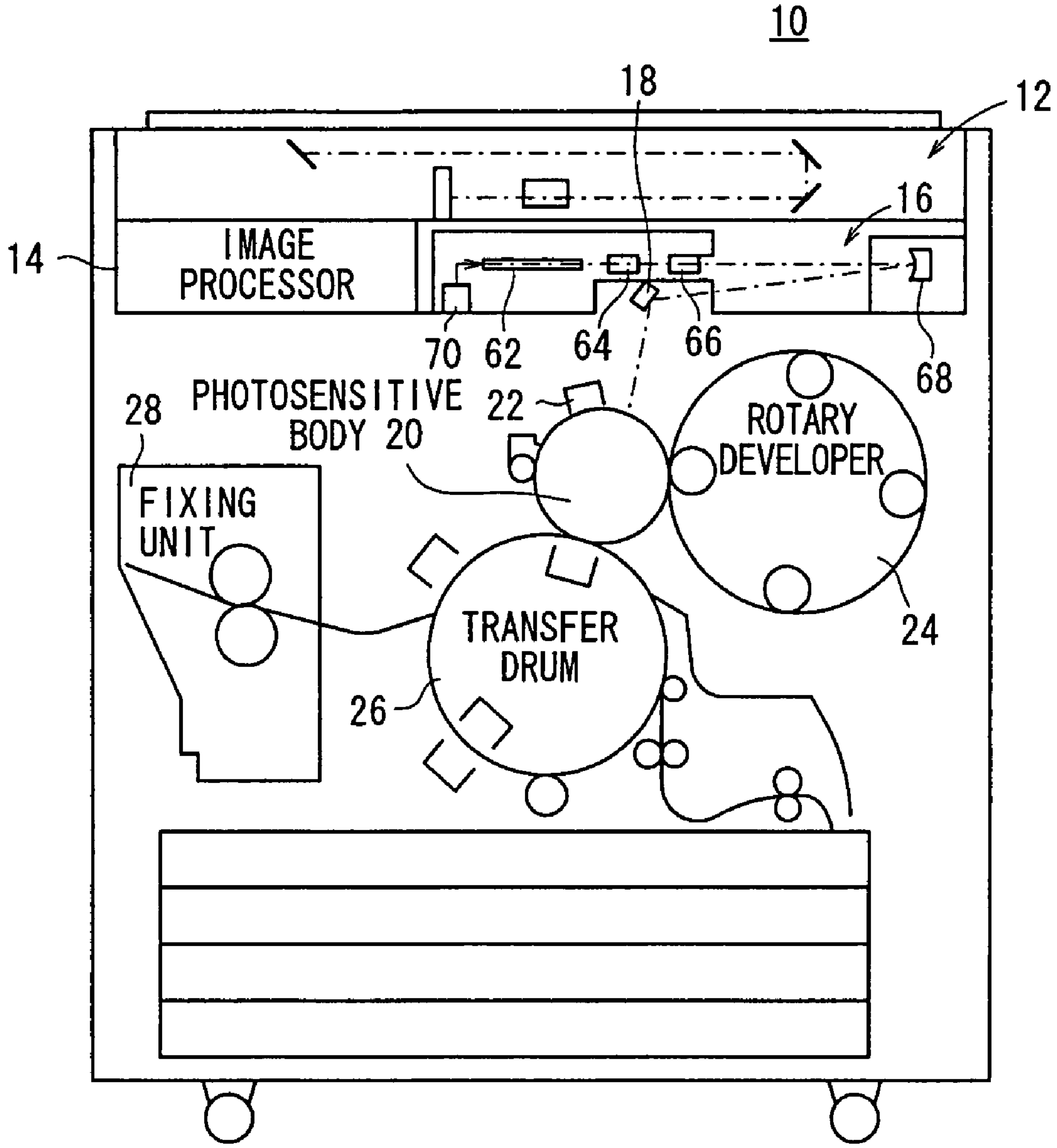
FIG. 1 is a schematic view of a color copying machine, to which an embodiment of the present invention is applied.

FIG. 1 schematically illustrates a digital electrophotographic color copying machine (image forming apparatus) 10, employing an AM screen to which an image forming method according to an embodiment of the present invention is applied. The image forming apparatus is not restricted to a color copying machine, but the present method may also be applied to electrophotographic color copying machines in general, such as a color printer, a color FAX machine, etc.

The color copying machine 10 comprises a scanner 12, an image processor 14, an ROS (Raster Optical Scanner) optical system 16, a polygon mirror 18, a photosensitive body 20, a charger 22, a rotary developer 24, a transfer drum 26, and a fixing unit 28.

The scanner 12 reads a color subject image placed on a glass platen, and supplies the read image signal as an 8-bit multivalued image signal (continuous tone image signal), in an R (red) G (green) B (blue) presentation system, to the image processor 14.

The image processor 14 outputs the continuous tone image signal as a binary pulse-width-modulated scanning image signal, which matches the resolution of the ROS optical system 16 for each scanning line.

Figure 2:
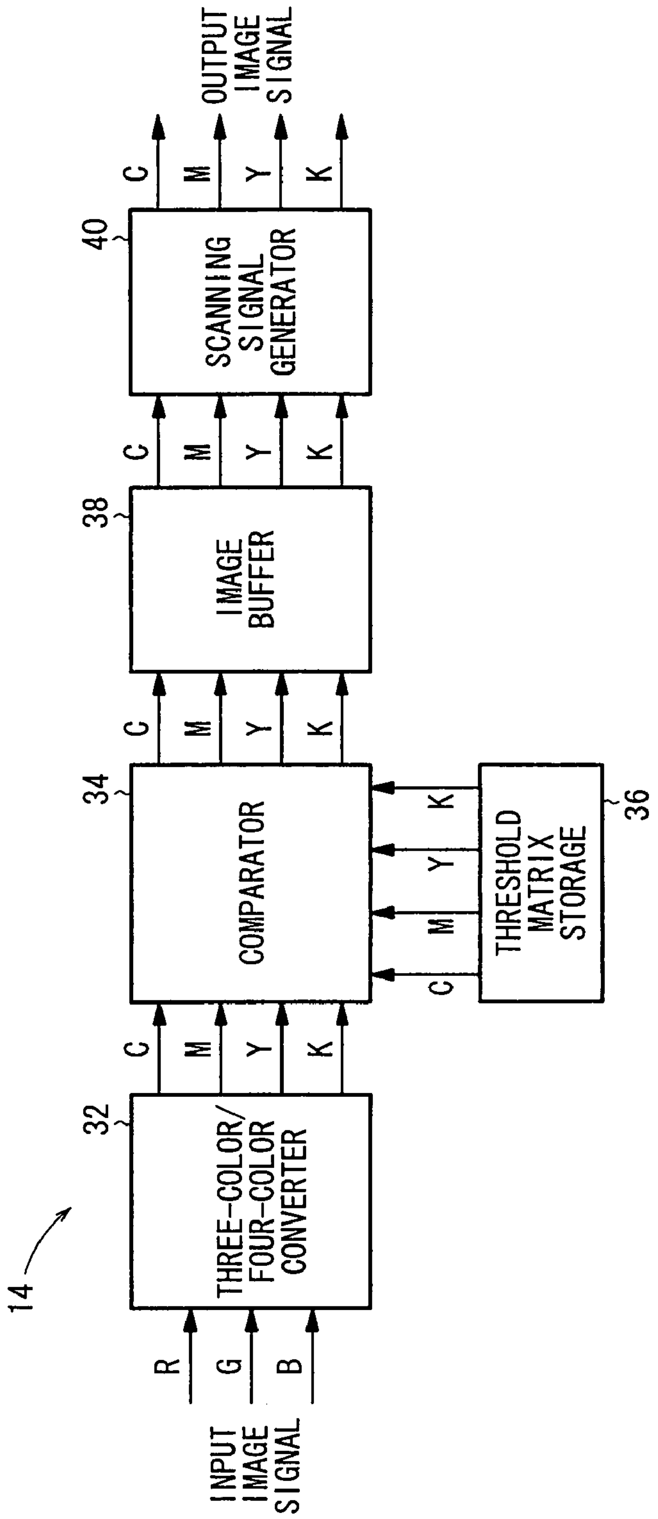
FIG. 2 is a block diagram of an image processor.

FIG. 2 schematically illustrates the image processor 14.

In FIG. 2, the R, G, B image signals input from the scanner 12 are separated into C, M, Y, K image signals by a three-color/four-color converter 32, which implements color correcting and UCR (Under Color Removal) processes. The C, M, Y, K image signals are supplied to a comparator 34.

The comparator 34 compares the input C, M, Y, K image signals with (thresholds of) respective C, M, Y, K threshold matrices stored in a threshold matrix storage 36, and controls blackening (coloring/plotting) and unblackening (whitening) of the pixels based on the comparison result, for thereby generating C, M, Y, K dot pattern signals, which form intermediate tone image signals representing binary images and having a periodic screen structure.

The threshold matrix storage 36 stores threshold matrices for generating images according to dot patterns, having a periodic structure and information that is descriptive of a periodic structure formed by a plurality of threshold matrices. The threshold matrix storage 36 stores a threshold matrix for a K plate (Y plate) of a rational screen, wherein assuming a screen angle θ is expressed as θ=arctan(m/n) where m and n are natural numbers, then the size of the threshold matrix satisfies a positive integral multiple of $m^2+n^2$, as well as storing threshold matrices for C and M plates of a supercell. The threshold matrix for the K plate (Y plate) of the rational screen, together with the threshold matrices for the C and M plates of the supercell, make up a screen set.

The C, M, Y, K dot pattern signals generated by the comparator 34 are temporarily stored in an image buffer 38. A scanning signal generator 40 synchronizes the C, M, Y, K dot pattern signals that are temporarily stored in the image buffer 38 with a scanning start signal, and outputs them as output image signals, which form binary pulse-width-modulated C, M, Y, K scanning image signals.

In FIG. 1, the binary C, M, Y, K output image signals output from the image processor 14 are supplied to the ROS optical system 16. The ROS optical system 16 comprises a laser driver circuit 70 and a laser beam source 62 serving as an exposure means, together with a collimator lens 64, an fθ lens 66, and a cylindrical lens 68, which collectively serve as an image focusing means.

In the ROS optical system 16, the laser driver circuit 70 generates a laser drive signal for turning on and off a laser beam depending on the binary C, M, Y, K output image supplied from the image processor 14, and thereby turns on and off the laser beam source 62. The laser beam from the laser beam source 62 is focused onto the photosensitive body 20 by the optical system, which is made up of the collimator lens 64, the fθ lens 66, and the cylindrical lens 68.

The laser beam, which is focused on the photosensitive body 20, is controlled by the polygon mirror 18 in order to scan the photosensitive body 20 in main scanning directions (directions perpendicular to the sheet of FIG. 1). The polygon mirror 18 generates the scanning start signal. In synchronism with the scanning start signal, the scanning signal generator 40 (see FIG. 2) of the image processor 14 outputs the binary C, M, Y, K output image signals.

The photosensitive body 20 is actuated to move in an auxiliary scanning direction by an actuating means, such as a servomotor or the like, for forming an electrostatic latent image of dot patterns. When the photosensitive body 20 is actuated to move in the auxiliary scanning direction and is scanned by the laser beam in the main scanning direction, an electrostatic latent image made up of two-dimensional dot patterns is formed on the photosensitive body 20.

The charger 22 precharges the photosensitive body 20 before the photosensitive body 20 is exposed to the laser beam.

The rotary developer 24 applies four-color C, M, Y, K toners (pigments), in the pattern of the electrostatic latent image.

The transfer drum 26 transfers the toner image to a white support body.

The fixing unit 28 serves to bond the powdery toner particles to the white support body.

Operation of the color copying machine 10 according to the present embodiment shall briefly be described below.

The scanner 12 reads a color subject image and inputs R, G, B image signals to the image processor 14. The image processor 14 separates the R, G, B image signals into four-color C, M, Y, K image signals.

In the image processor 14, the comparator 34 compares the input C, M, Y, K image signals with threshold matrices for the respective C, M, Y, K plates, which are stored in the threshold matrix storage 36, and generates dot pattern signals having a periodic screen structure.

The dot pattern signals are temporarily stored in the image buffer 38, and are output as a binary pulse-width-modulated scanning image signal, which matches the resolution of the ROS optical system 16 for each scanning line, to the laser driver circuit 70 of the ROS optical system 16 in synchronism with the scanning start signal. In response to the scanning image signal, the laser driver circuit 70 turns on and off the laser beam source 62. The laser beam emitted from the laser beam source 62 is focused onto the photosensitive body 20 by the optical system, which is made up of the collimator lens 64, the fθ lens 66, and the cylindrical lens 68, and is controlled by the polygon mirror 18 in order to scan the photosensitive body 20 in the main scanning direction.

The photosensitive body 20 is precharged to a uniform surface potential by the charger 22. The laser beam is applied to the photosensitive body 20 in order to lower the potential of the exposed area, thereby producing an electrostatic latent image thereon.

The electrostatic latent image is developed by one of four-color two-component developing units, which are disposed in the rotary developer 24.

The developed toner image on the photosensitive body 20 is transferred, one color at a time, from the transfer drum 26 to the white support body.

The C, M, Y, K toner images are successively transferred to the white support body. After the toner images in four colors have been transferred to the white support body, the recording sheet is peeled off from the transfer drum 26. The toner images are fused with heat by the fixing unit 28 and are bonded to the white support body.

In this manner, a hard copy is produced, with a color image formed thereon from the toner images in four colors on the white support body.

Features of the color image, which is an image made up of dot patterns formed on the hard copy output from the color copying machine 10, shall be described below.

First, the formation of a color image by means of C, M, Y, K plates shall be described below.

Figure 3:
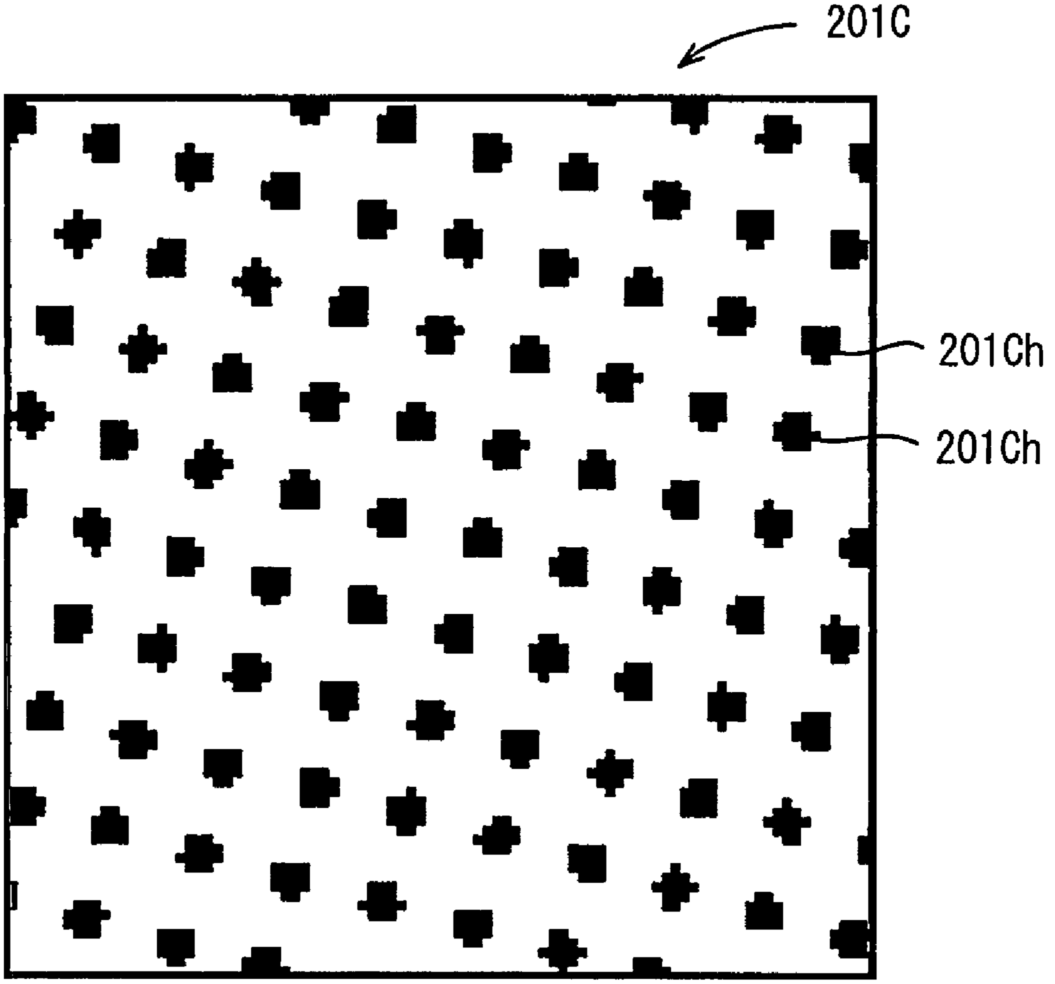
FIG. 3 is a diagram illustrating an image of a C plate halftone dot pattern of a supercell.

FIG. 3 illustrates a C plate halftone dot pattern 201C produced by the comparator 34, as a result of comparison between a C image signal of uniform density and a C plate threshold matrix of a supercell. According to the supercell process, the C plate halftone dot pattern 201C has a screen angle θ=15.255° (arctan(3/11)) and a screen ruling LPI (Line Per Inch)=244.233. Because of the supercell process, the screen angle θ is an angle quite close to 15°, but the halftone dots 201Ch have different shapes.

Figure 4:
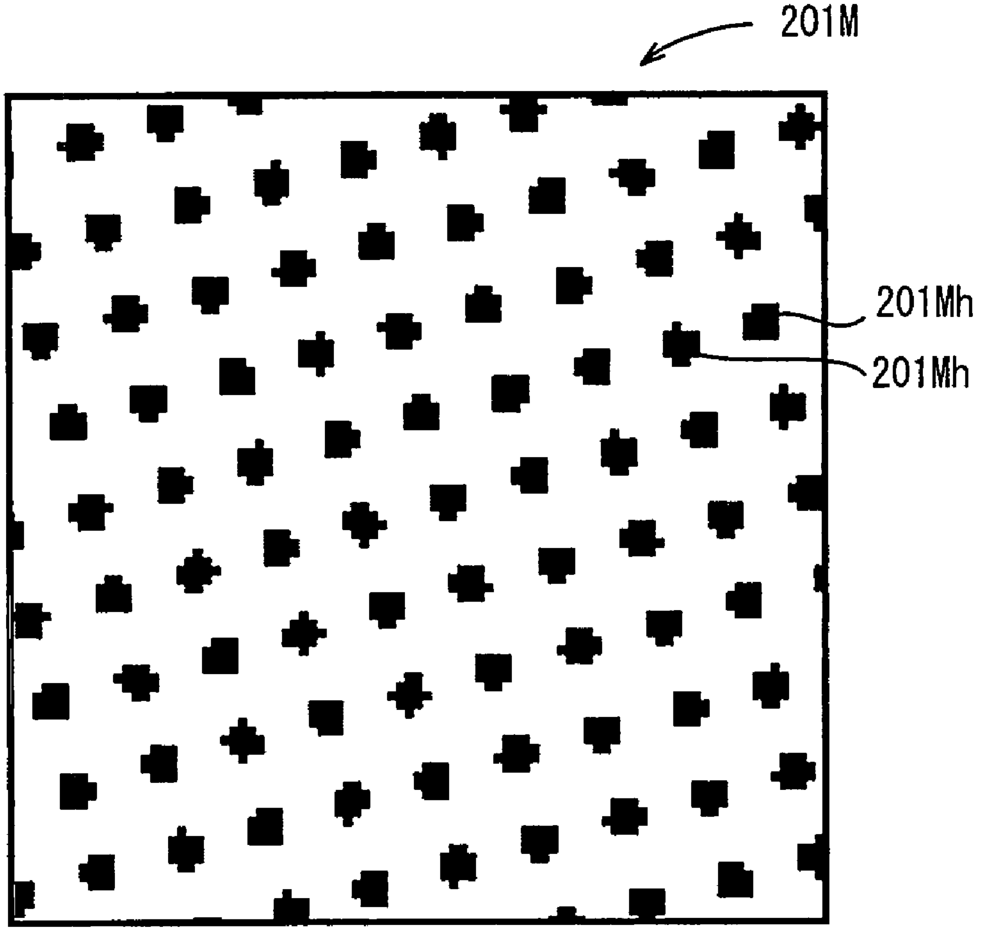
FIG. 4 is a diagram illustrating an image of an M plate halftone dot pattern of a supercell.

FIG. 4 illustrates an M plate halftone dot pattern 201M produced by the comparator 34, as a result of comparison between an M image signal of uniform density and an M plate threshold matrix of a supercell. According to the supercell process, the M plate halftone dot pattern 201M has a screen angle θ=74.7450 (arctan(11/3)) and a screen ruling of 244.323 LPI. Because of the supercell process, the screen angle θ is angularly spaced 60° from the C plate halftone dot pattern, but the halftone dots 201Mh have different shapes.

Figure 5:
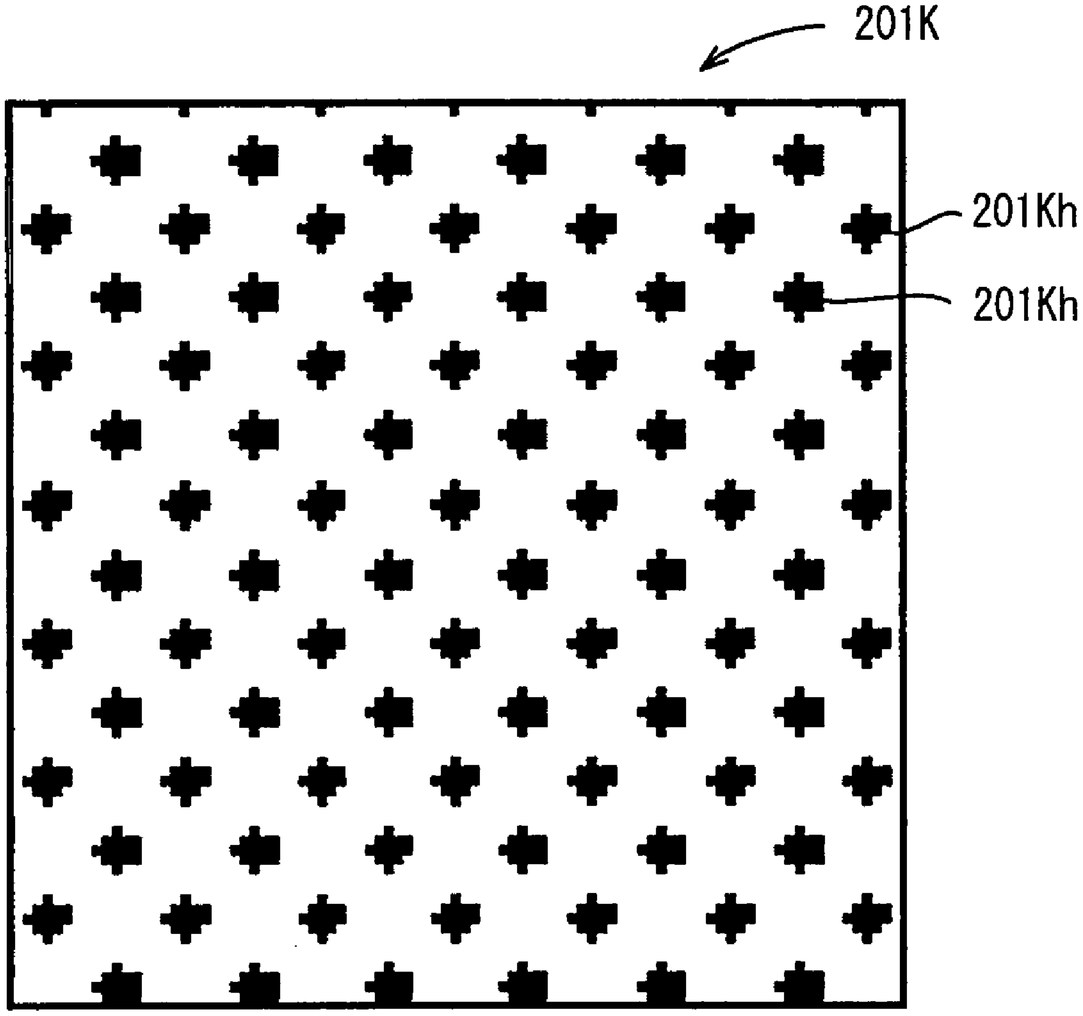
FIG. 5 is a diagram illustrating an image of a K plate halftone dot pattern of a rational screen.

FIG. 5 illustrates a K plate halftone dot pattern 201K produced by the comparator 34, as a result of comparison between a K image signal of uniform density and a K plate threshold matrix of a rational screen. According to the rational screen process, the K plate halftone dot pattern 201K has a screen angle θ=45° (arctan(1/1)) and a screen ruling of 242.437 LPI. The halftone dots 201Kh have substantially the same shape.

As described above, the numbers and shapes of the pixels of the halftone dots 201Ch, 201Mh of the halftone dot patterns 201C, 201M according to the supercell process are different, as shown in FIGS. 3 and 4. However, the number and shapes of the pixels of the halftone dots 201Kh of the halftone dot pattern 201K according to the rational screen are substantially constant, as shown in FIG. 5.

Figure 6:
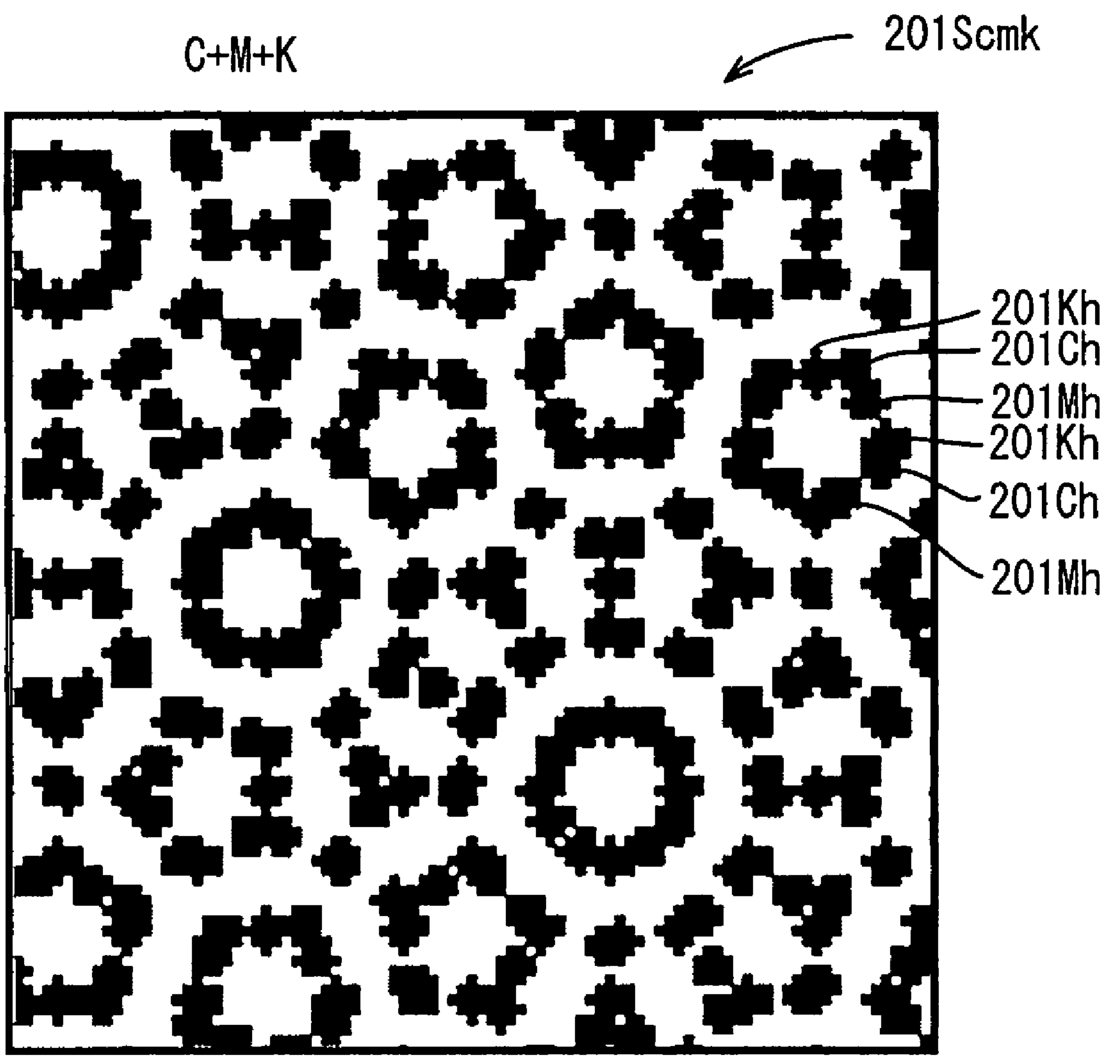
FIG. 6 is a diagram illustrating an image of a combined halftone dot pattern, which is made up of a combination of the C, M, and K plate halftone dot patterns.

FIG. 6 shows a combined CMK plate halftone dot pattern 201Scmk, which is a combination of the C, M, and K plate halftone dot patterns 201C, 201M, 201K. The K plate is formed according to the rational screen, and the combined CMK plate halftone dot pattern 201Scmk, in which the C, M, K plates are angularly spaced by intervals of 30° (central value), allows a rosetta pattern to be visually recognized, and therefore, moiré patterns are prevented from being produced. Inasmuch as the halftone dots of the K plate halftone dot pattern 201K, which is the most visually recognizable, are of substantially the same shape, stripes and irregularities caused by toner deposition irregularities are also prevented from occurring.

Secondly, features of a color image produced by means of C, M, Y, K plates, which are provided by adding a Y plate to a color image formed according to the C, M and K plates, shall be described below.

Figure 7:
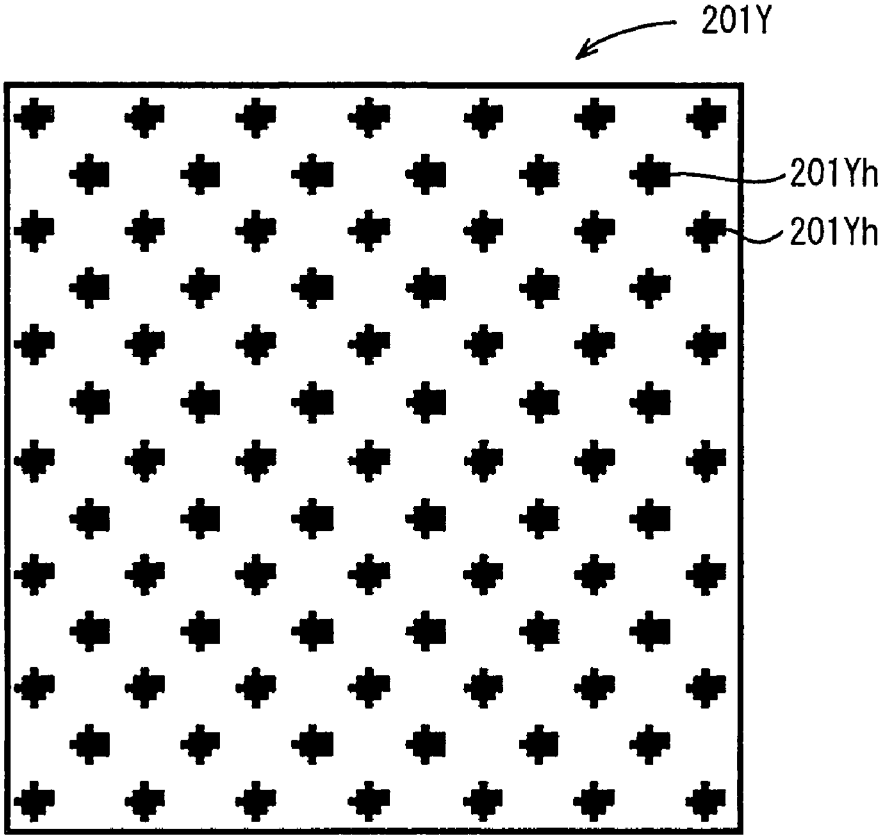
FIG. 7 is a diagram illustrating an image of a Y plate halftone dot pattern, which is produced by shifting the K plate halftone dot pattern of the rational screen shown in FIG. 5 180° in phase.

FIG. 7 illustrates a Y plate halftone dot pattern 201Y produced by the comparator 34 as a result of comparison between a Y image signal of uniform density and a Y plate threshold matrix of a rational screen. The Y plate halftone dot pattern 201Y has a screen angle θ=45°, which is the same as the screen angle of the K plate halftone dot pattern described above, and a screen ruling of 242.437 LPI, which is also the same as the screen ruling of the K plate halftone dot pattern. Consequently, the halftone dots 201Kh have identical shapes. The Y plate halftone dot pattern 201Y is formed by the same rational screen as the K plate halftone dot pattern 201K shown in FIG. 5, while being shifted 180° in phase therefrom.

Figure 8:
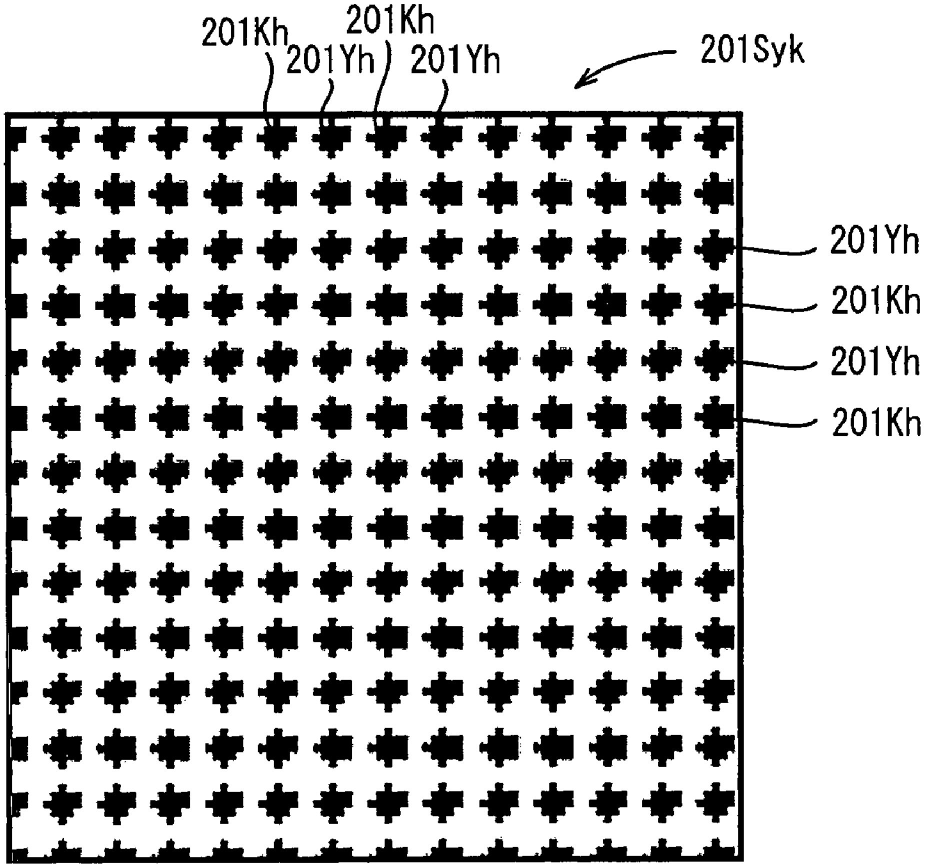
FIG. 8 is a diagram illustrating an image made up of a combined YK plate halftone dot pattern, which is a combination of a K plate halftone dot pattern image and a Y plate halftone dot pattern image of a rational screen.

More specifically, FIG. 8 illustrates a combined YK plate halftone dot pattern 201Syk, which is a combination of the K plate halftone dot pattern 201K shown in FIG. 5 and the Y plate halftone dot pattern 201Y shown in FIG. 7, and which is shifted 180° in phase. As can be seen on the combined YK plate halftone dot pattern 201Syk, the halftone dots indicated by Y, K are shifted 180° in phase (i.e., they do not overlap each other).

Figure 9:
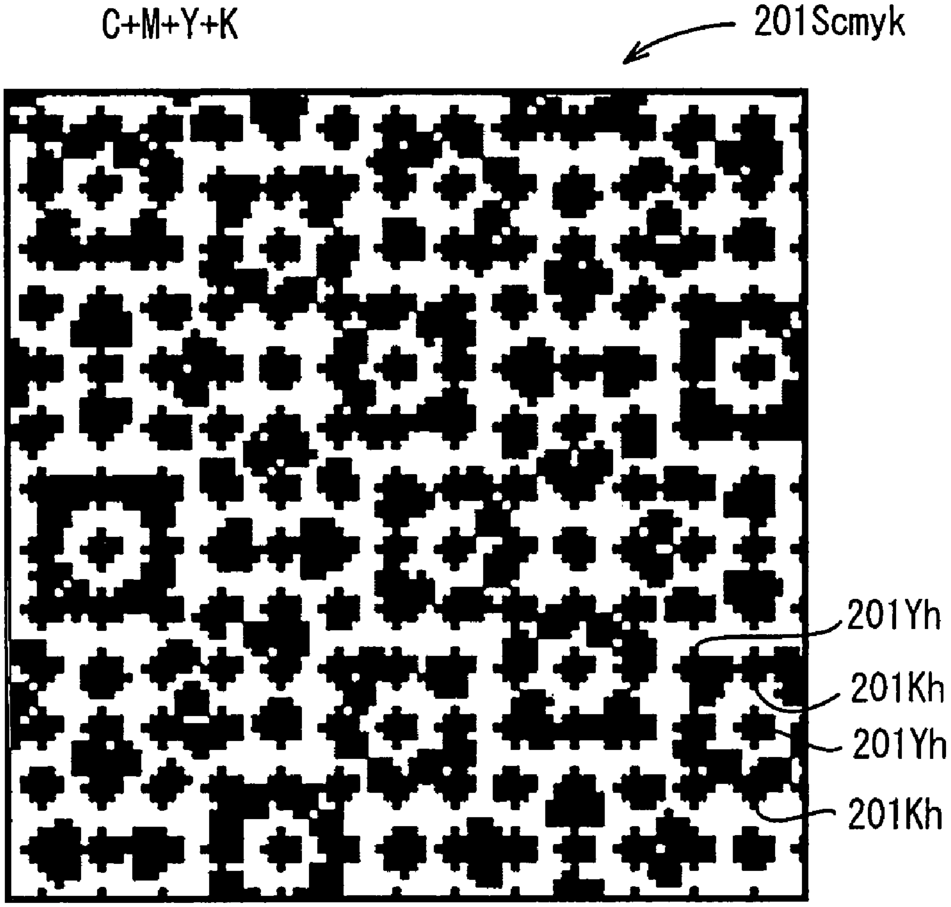
FIG. 9 is a diagram illustrating an image made up of a combined halftone dot pattern, which is a combination of C, M, Y, and K plate halftone dot patterns.

FIG. 9 illustrates a combined CMYK plate halftone dot pattern 201Scmyk, which is a combination of the combined CMK plate halftone dot pattern 201Scmk shown in FIG. 6 and the Y plate halftone dot pattern 201Y shown in FIG. 7. As can be seen, although it is difficult to perceive due to the monochromatic representation, on the combined CMYK plate halftone dot pattern 201Scmyk, the K plate halftone dots 201Kh and the Y plate halftone dots 201Yh are shifted 180° in phase (i.e., they do not overlap each other).

For adding the Y plate halftone dot pattern in order to produce the combined CMYK plate halftone dot pattern 201Scmyk, which is a CMYK color image, a Y plate is employed, which is the same rational screen as the K plate, wherein the Y plate is shifted in phase from the K plate, thereby reducing overlapping of halftone dots and suppressing moiré patterns caused by the use of a powdery toner having a large particle size, i.e., a so-called pile height moiré. Such a pile height moiré pattern can be suppressed by shifting the Y and K plates in phase, within a range from 150° to 210°.

On the monochromatic representation shown in FIG. 9, the K plate halftone dots 201Kh appear to have the same density as the Y plate halftone dots 201Yh. However, actually, since the Y plate is less noticeable, a rosetta pattern, which is a feature of the combined CMK halftone dot pattern 201Scmk shown in FIG. 6, is visible on the color image, thereby preventing moiré patterns from being produced. Furthermore, since the halftone dots 201Kh of the K plate halftone dot pattern 201K, which is of the highest visibility, are substantially constant in shape, factors that are responsible for causing stripes and irregularities also are reduced.

Thirdly, other combinations, which are similarly advantageous to those described above (i.e., which act to prevent moiré patterns and to reduce the factors responsible for causing stripes and irregularities), shall be described below. The above combination of C, M, Y, K plates is referred to as a first combination (wherein rational screens are used for the Y, K plates and supercells are used for the C, M plates).

Second combination (wherein rational screens are used for the Y, K plates and supercells are used for the C, M plates):

K plate (doubling as a Y plate): θ=77.471°, LPI=260.317;
C plate: θ=17.103°, LPI=256.028; and
M plate: θ=46.469°, LPI=259.635.

Third combination (wherein rational screens are used for the Y, K plates and supercells are used for the C, M plates):

K plate (doubling as a Y plate): θ=77.471°, LPI=260.317;
C plate: θ=16.504°, LPI=256.038; and
M plate: θ=47.862°, LPI=266.538.

Fourth combination (wherein rational screens are used for the Y, K plates and supercells are used for the C, M plates):

K plate (doubling as a Y plate): θ=83.660°, LPI=265.036;
C plate: θ=23.749°, LPI=266.468; and
M plate: θ=53.972°, LPI=265.394.

Fifth combination (wherein rational screens are used for the Y, K plates and supercells are used for the C, M plates):

K plate (doubling as a Y plate): θ=84.289°, LPI=238.8089;
C plate: θ=23.962°, LPI=234.032; and
M plate: θ=53.130°, LPI=237.623.

Sixth combination (wherein rational screens are used for the Y, K plates and supercells are used for the C, M plates):

K plate (doubling as a Y plate): θ=66.038°, LPI=243.683;
C plate: θ=5.711°, LPI=248.657; and
M plate: θ=36.870°, LPI=247.423.

Taking into account the above first through sixth combinations, if variations in the screen rulings for the respective colors are set at 10 LPI or less, then the screen rulings provide conditions for angularly spacing the K, C and M plates at intervals of 30°, thereby reducing factors responsible for causing moiré patterns. It has been found that the interval of 30° (set value), at which the C and M plates are angularly spaced from each other, should preferably lie within a range substantially of 30°±1.50.

Using a so-called multibeam color copying machine, wherein the nominal sequence (CMYK)=(15°, 45°, 0°, 75°) for printing is achieved by a plurality of laser beam sources arranged in a 0° direction, since interference irregularities tend to occur, it is effective to shift the plates by an angle of 7.5° or 22.5°.

A description for clarifying the advantages of the present invention in an electrophotographic process shall be presented below, along with descriptions of other embodiments of the present invention.

Figure 10:
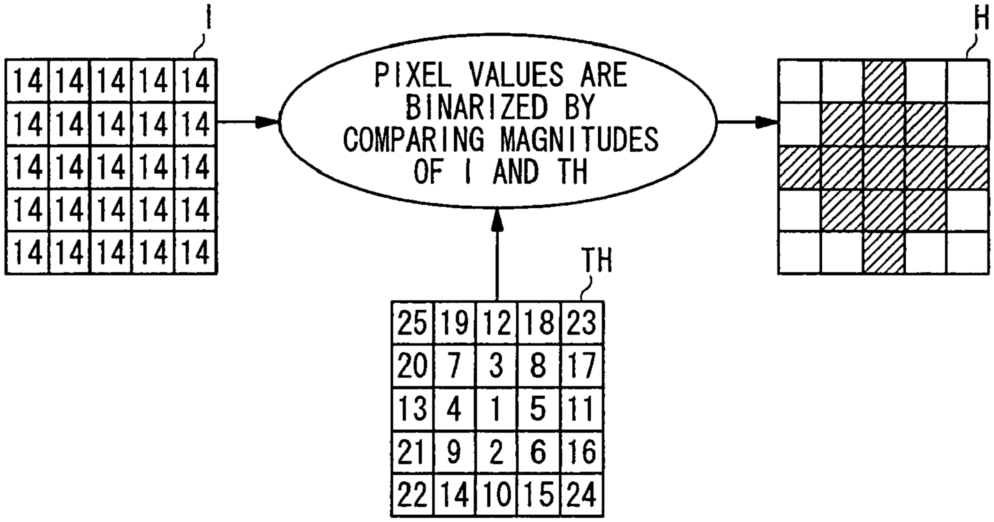
FIG. 10 is a diagram illustrating a binarizing process.

In a conventional electrophotographic image forming apparatus, as shown in FIG. 10, pixel values I of image data having a uniform density (pixel values=14 in this example), and thresholds TH of a threshold matrix, are mapped to each other. The pixel values I are binarized based on a relationship between magnitudes of the pixel values I and the thresholds TH, thereby producing halftone dots H (whitened if I≦TH and blackened (plotted) if I>TH). Because the conventional image forming apparatus has a small memory capacity for storing the threshold matrix that binarizes the pixel values, and does not employ a supercell threshold matrix having a large size, the screens for the C, M, K plates cannot angularly spaced at intervals of 30°. Therefore, a secondary moiré component is liable to occur due to the three screens, wherein the secondary moiré component is defined as follows: It is assumed that screens, which have rulings representing their sizes as well as angles representing directions perpendicular to the direction in which the screens are arranged, have frequency vectors. The secondary moiré component refers to a moiré pattern represented by a vector, which is produced as a result of a difference between a combined vector of two of the screens and vectors of the screens that make up the combined vector.

However, if supercell threshold matrices are used for all of the C, M, K plates, unlike rational screens, since the halftone dots are irregular in shape, noises can easily be picked up and visually recognized in the electrophotographic process. Therefore, as described above, the K plate, which is the most conspicuous in color, is formed as a rational screen.

Figure 11:
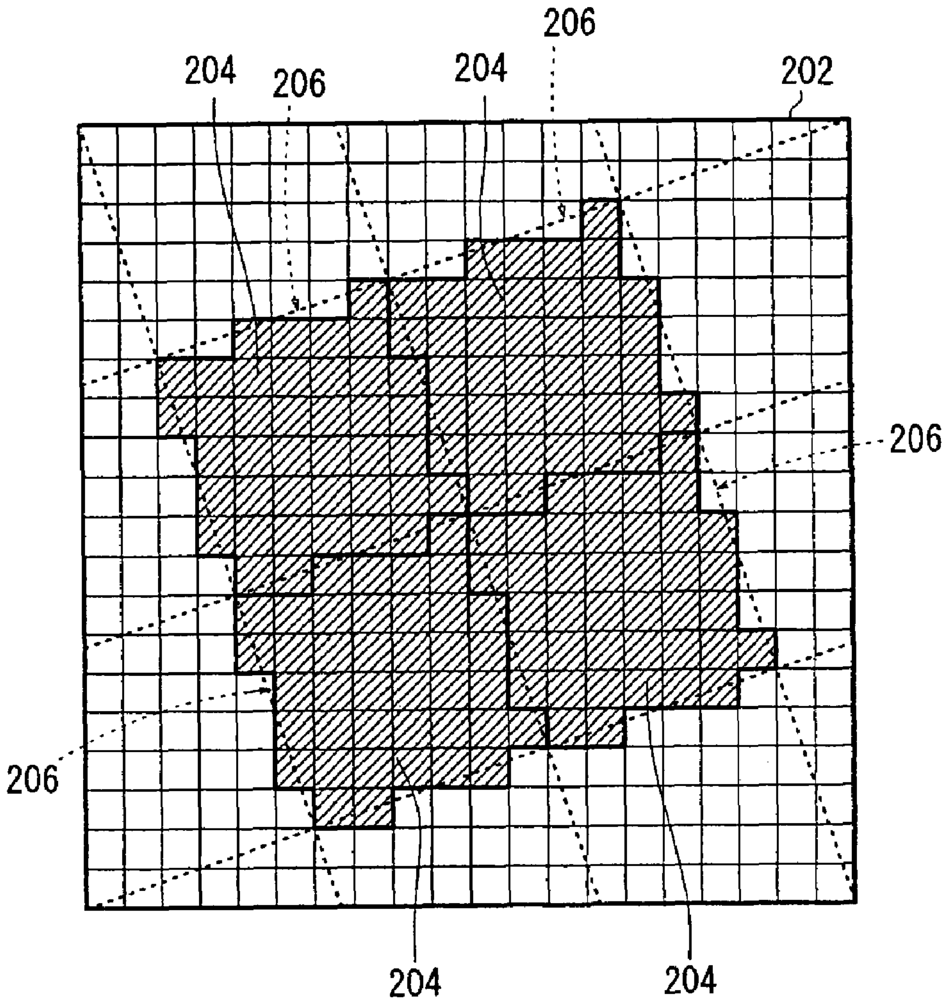
FIG. 11 is a diagram illustrating the size of a threshold matrix of a rational screen.
Figure 11:
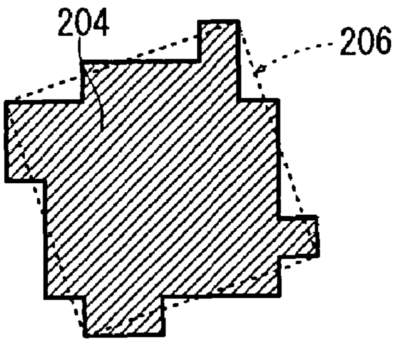
Figure 12:
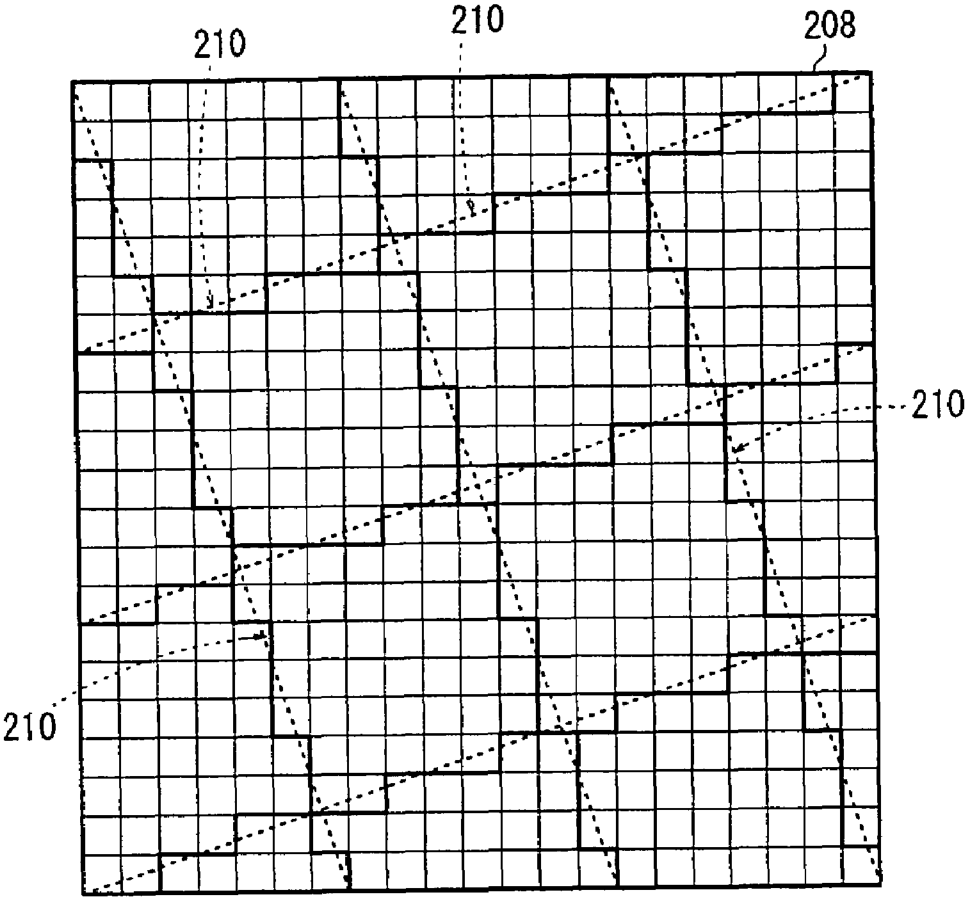
FIG. 12 is a diagram illustrating the size of a threshold matrix of a supercell.

FIGS. 11 and 12 illustrate respective sizes of a threshold matrix formed as a rational screen and a threshold matrix formed as a supercell.

In the rational screen shown in FIG. 11, if the screen angle θ is expressed as θ=arctan(m/n) where m and n are natural numbers, then the size of the threshold matrix 202 is a positive integral multiple of $m^2+n^2$. Specifically, if n=3 and m=1, then arctan(m/n)=arctan(1/3), and hence the size of the threshold matrix 202 is 20×20, which is a positive integral multiple "2" of $m^2+n^2=10$. The shapes of the halftone dots 204 also are the same as each other, and each of the halftone cells 206 has four corners, which are aligned with the corners of the pixels that are positioned at the four corners.

FIG. 12 shows a supercell threshold matrix 208, which has a size of 21×21. The shapes of the halftone dots are different from each other, and each of the halftone cells 210 has four corners, which are not aligned with the corners of the pixels that are positioned at the four corners.

An evaluation of color change, or in other words, a color difference (also referred to as a color shift), caused by a so-called registration shift, which occurs when the halftone dots are shifted from an ideal design overlap using a screen set, shall be described below. A color difference has been proposed in the specification and drawings (to be described below) of a different application (Japanese Patent Application No. 2005-102898), having the same inventor and applicant as the present application. The color difference shall be described below, based on the specification and drawings of the aforementioned application.

Figure 13:
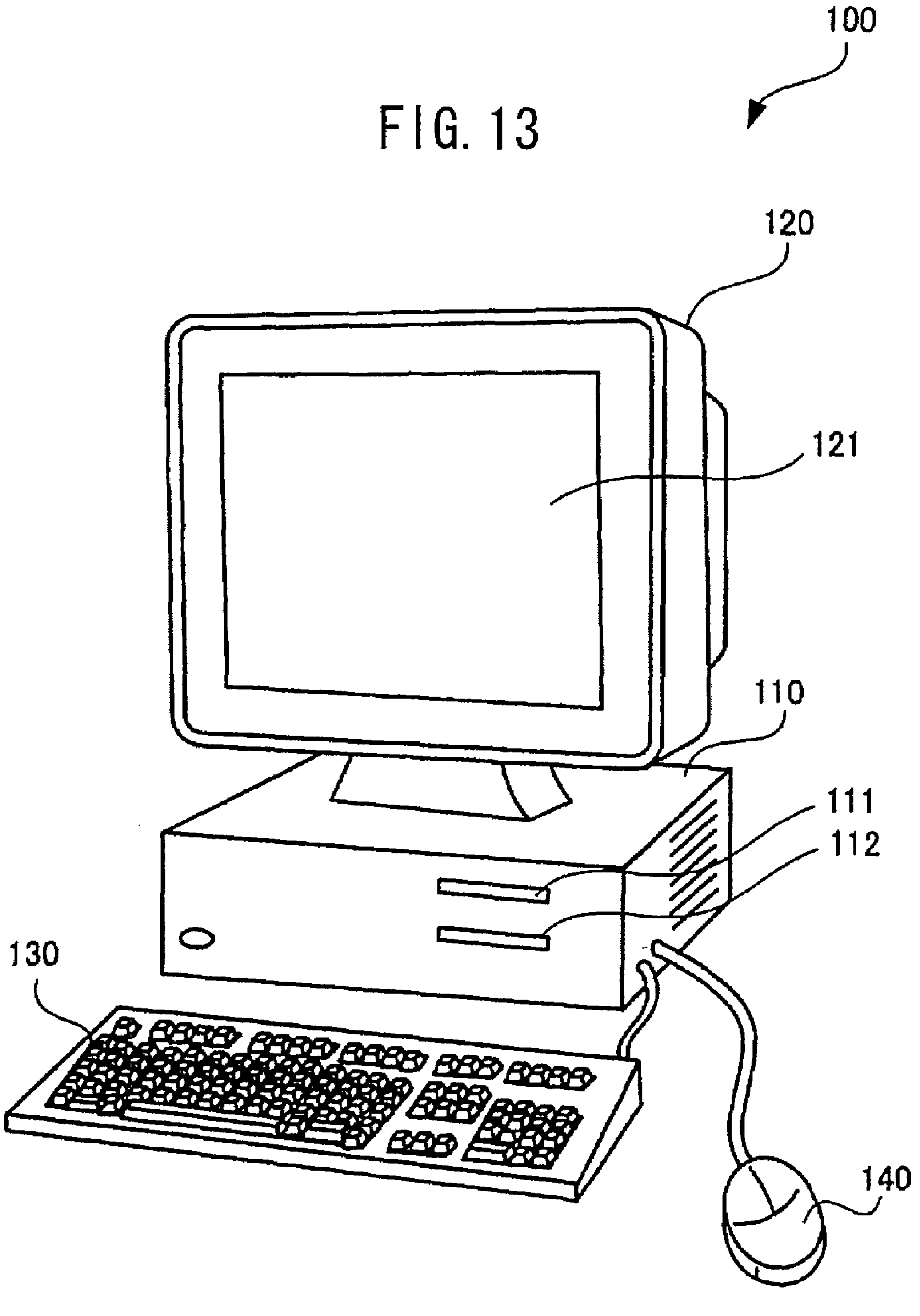
FIG. 13 shows a personal computer, to which an embodiment of the present invention is applied.

FIG. 13 shows a personal computer for calculating the color difference.

As shown in FIG. 13, the personal computer 100 comprises a main body 110 housing a CPU, a main storage, a hard disk, a communication board, etc., a display 120 for displaying images and character strings on a display screen 121 according to instructions from the main body 110, a keyboard 130 for entering user commands and character information into the personal computer 100, and a mouse 140 for designating a desired position on the display screen 121, for entering instructions depending on an icon or the like that is displayed at a position where the desired position is designated.

The main body 110 includes a CD loading slot 111 for removably loading a CD-ROM or a CD-R therein, and houses therein a CD-ROM drive for reproducing information that is stored in the CD-ROM or CD-R that is loaded into the CD loading slot 111. The main body 110 also includes an FD loading slot 112 for removably loading a flexible disk (FD) therein, and houses therein an FD drive for recording information on and reading information from the flexible disk that is loaded into the FD loading slot 112.

A halftone dot evaluation program is stored in the CD-ROM. When the CD-ROM is loaded into the CD loading slot 111, the halftone dot evaluation program stored on the CD-ROM is read by the CD-ROM drive, and installed on the hard disk housed within the main body 110.

When the halftone dot evaluation program installed on the hard disk is activated and executed, the personal computer 100 operates as a halftone dot evaluating apparatus. Stated otherwise, the personal computer 100 and the halftone dot evaluation program are combined with each other, thereby making up a halftone dot evaluating apparatus. The halftone dot evaluating apparatus operates to perform the halftone dot evaluating method.

Figure 14:
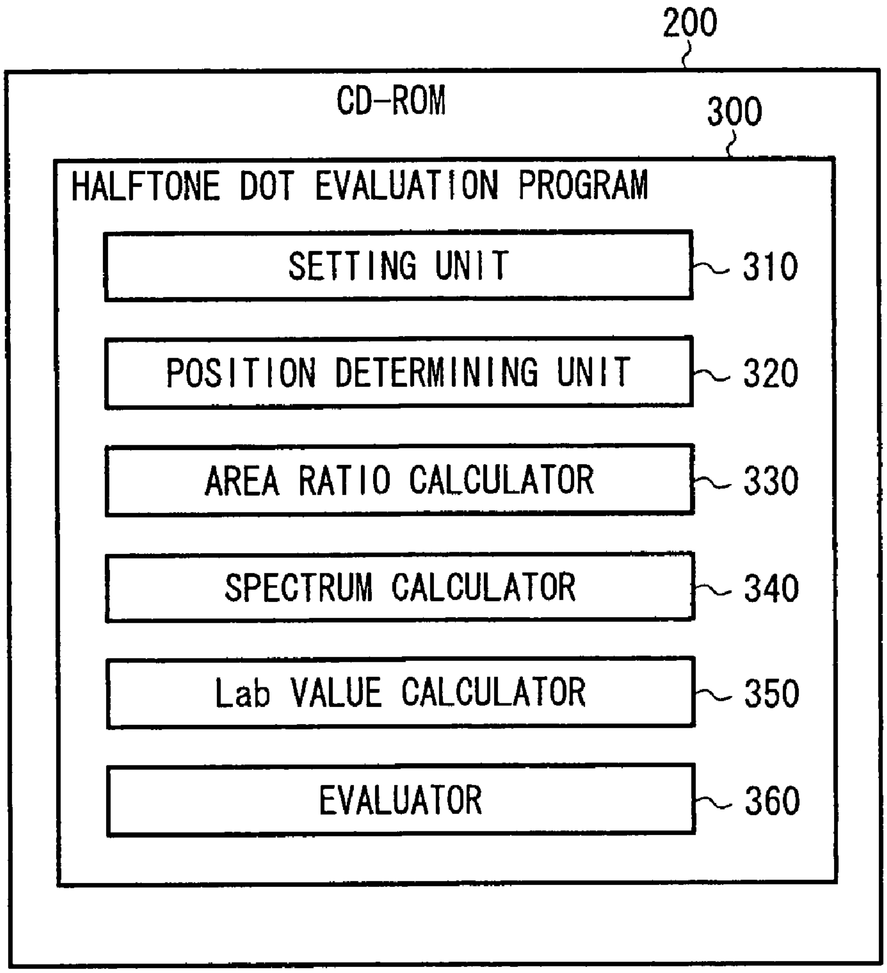
FIG. 14 is a diagram showing an embodiment of a halftone dot evaluating program according to the present invention.

FIG. 14 shows the halftone dot evaluation program. As shown in FIG. 14, the halftone dot evaluation program 300 is stored on the CD-ROM 200.

The storage medium for storing the halftone dot evaluation program is not limited to being a CD-ROM, but may be a different storage medium, such as an optical disk, an MO, a floppy (registered trademark) disk, a magnetic disk, or the like. Further, the halftone dot evaluation program needn't be stored in a storage medium at all, but may be supplied directly to the personal computer through a communications network.

The halftone dot evaluation program 300 is executed by the personal computer 100 shown in FIG. 13, thereby enabling the personal computer 100 to operate as the halftone dot evaluating apparatus. The halftone dot evaluation program 300 functions as a setting unit 310, a position determining unit 320, an area ratio calculator 330, a spectrum calculator 340, a Lab value calculator 350 and an evaluator 360.

Details of the halftone dot evaluation program 300 components shall be described later.

Figure 15:
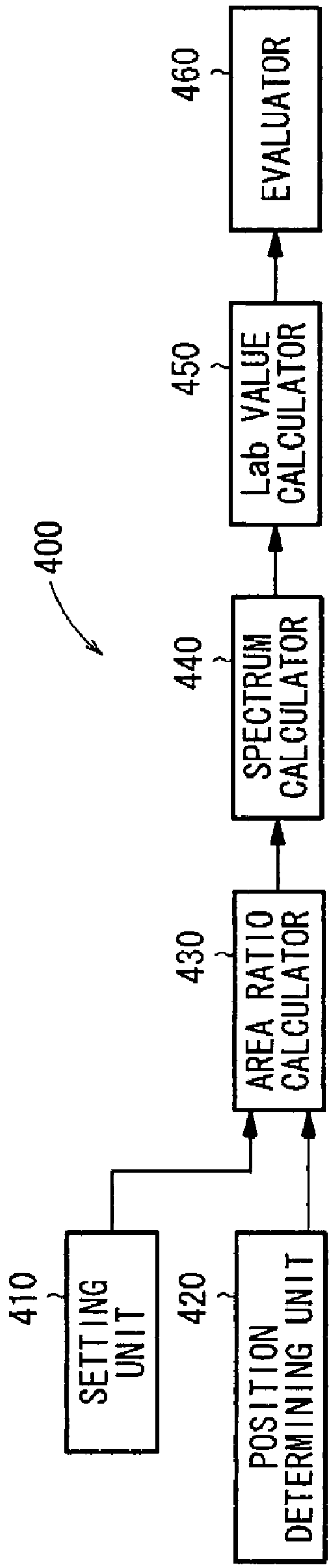
FIG. 15 is a functional block diagram of an embodiment of a halftone dot evaluating apparatus according to the present invention.

FIG. 15 is a functional block diagram of the halftone dot evaluating apparatus.

The halftone dot evaluating apparatus 400 is implemented once the halftone dot evaluation program 300, shown in FIG. 14, is installed on the personal computer 100, as shown in FIG. 13, and executed thereby.

The halftone dot evaluating apparatus 400 comprises a setting unit 410, a position determining unit 420, an area ratio calculator 430, a spectrum calculator 440, a Lab value calculator 450 and an evaluator 460. The setting unit 410, the position determining unit 420, the area ratio calculator 430, the spectrum calculator 440, the Lab value calculator 450 and the evaluator 460 are implemented on the personal computer 100, respectively, through execution of the setting unit 310, the position determining unit 320, the area ratio calculator 330, the spectrum calculator 340, the Lab value calculator 350 and the evaluator 360. Therefore, the components of the halftone dot evaluating apparatus 400, as shown in FIG. 15, correspond respectively to the components of the halftone dot evaluation program 300 shown in FIG. 14. Whereas the components shown in FIG. 15 are implemented through a combination of hardware made up of the personal computer 100 shown in FIG. 13, an OS, and application programs which are executed by the personal computer 100, the components shown in FIG. 14 are implemented solely by the application programs themselves.

The setting unit 410, the position determining unit 420, the area ratio calculator 430, the spectrum calculator 440, the Lab value calculator 450, and the evaluator 460 correspond, respectively, to examples of a setting unit, a position determining unit, an area ratio calculator, a spectrum calculator, a tristimulus value calculator, and an evaluator, in the halftone dot evaluating apparatus.

Details of the components of the halftone dot evaluating apparatus 400 shall be described later.

Figure 16:
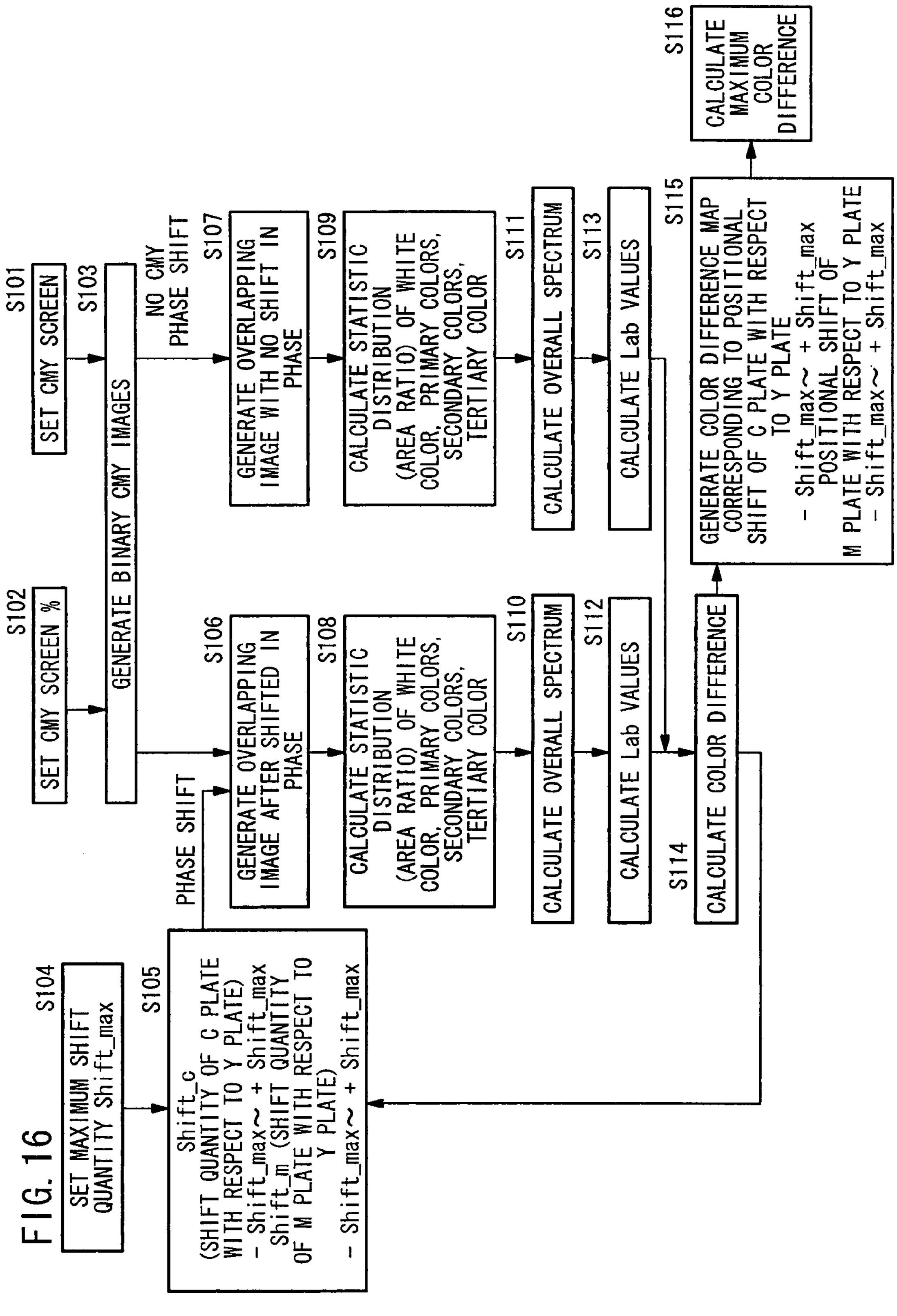
FIG. 16 is a flowchart of an embodiment of a halftone dot evaluating method according to the present invention.

FIG. 16 is a flowchart illustrating the halftone dot evaluating method.

The halftone dot evaluating method is carried out upon operation of the halftone dot evaluating apparatus 400 shown in FIG. 15. The halftone dot evaluating method includes a setting process (steps S101 through S103), a position determining process (steps S104, S105), an area ratio calculating process (steps S106 through S109), a spectrum calculating process (steps S110, S111), a Lab value calculating process (steps S112, S113), and an evaluating process (steps S114 through S116). The processes are carried out by respective components of the halftone dot evaluating apparatus 400 shown in FIG. 15, wherein processing details thereof are determined by the components of the halftone dot evaluation program 300 shown in FIG. 14. The setting process, the position determining process, the area ratio calculating process, the spectrum calculating process, the Lab value calculating process, and the evaluating process correspond, respectively, to examples of a setting process, a position determining process, an area ratio calculating process, a spectrum calculating process, a Lab value calculating process, and an evaluating process in the halftone dot evaluating method.

Details of the steps shown in FIG. 16 shall be described below, in combination with components of the halftone dot evaluating apparatus 400 shown in FIG. 15, as well as components of the halftone dot evaluation program 300 shown in FIG. 14.

When the halftone dot evaluating method shown in FIG. 16 is initiated, a halftone dot screen is set (step S101). The halftone dot screen defines a change in the halftone dot shape due to changes in the halftone dot structure and the halftone dot area ratio. Designing halftone dots implies designing a halftone dot screen. The halftone dot screen comprises an array of thresholds, which are compared with pixel values. An area in which pixel values are equal to or higher than the thresholds is plotted as a portion of the halftone dots, and an area where the pixel values are smaller than the thresholds is whitened. Therefore, the halftone dot screen serves to convert an image represented by continuous tone pixel values into a binary image, made up of plotted halftone dots and whitened areas. The halftone dot screen is prepared for each of the ink colors used to output the color image. In the present embodiment, halftone dot screens are set respectively for three colors, made up of C (cyan), M (magenta) and Y (yellow). The set of halftone dot screens, thus set for the respective colors, corresponds to one example of a screen set.

Then, a halftone dot area ratio (screen percentage) is set for each of the three colors C, M and Y. The halftone dot area ratio (screen percentage) represents a percentage of plotted positions in the threshold array of the halftone dot screen. If the halftone dot area ratio is 40%, for example, 40% of the threshold array, where the thresholds are smaller, is plotted, whereas the remaining 60% of the threshold array is whitened. The plotted and whitened areas are determined for each of the three colors C, M and Y, thereby finalizing the shapes and sizes of the halftone dots for each of the three colors C, M and Y.

Figure 17:
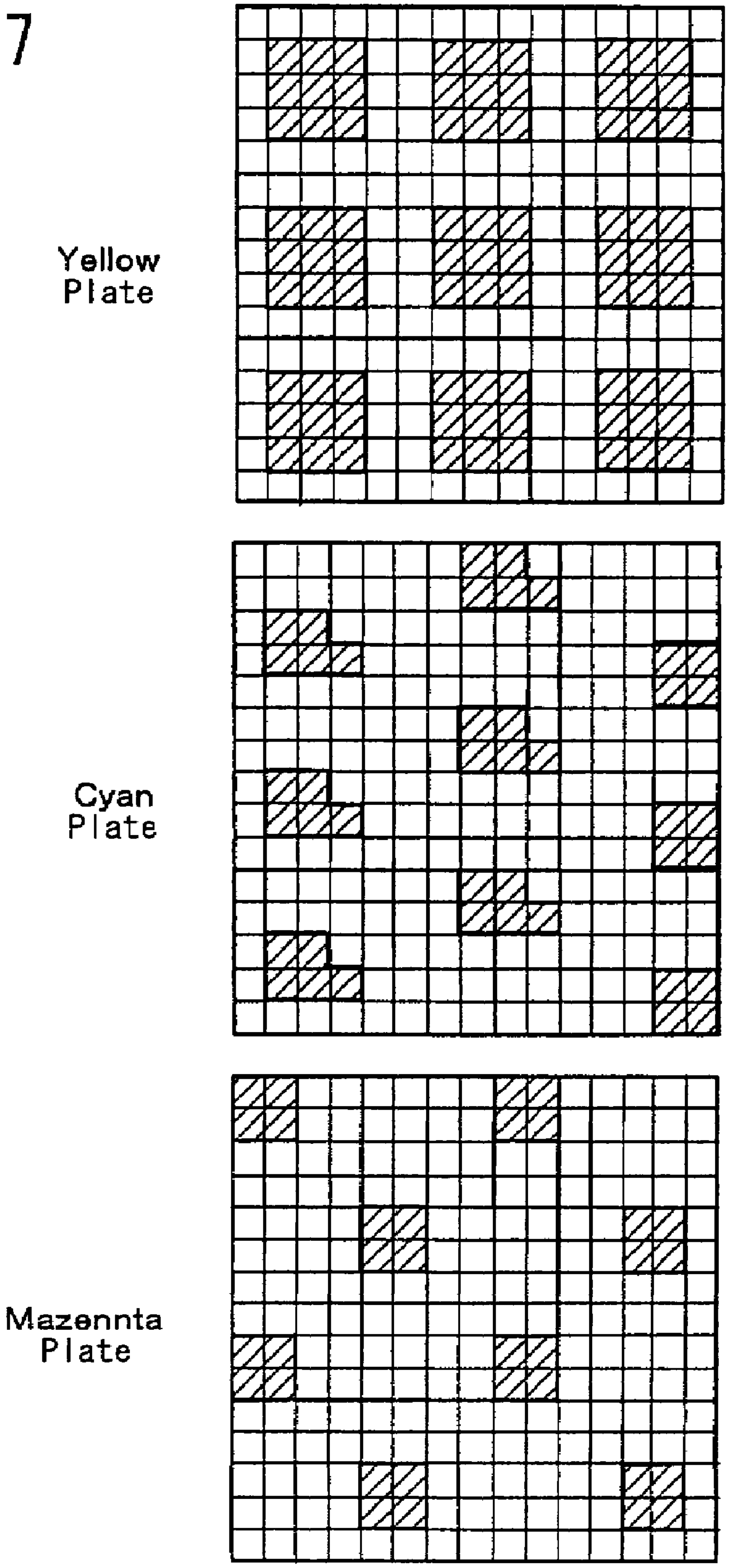
FIG. 17 is a diagram schematically showing halftone dots made up of three colors C, M, Y, which are obtained during step S103 of FIG. 16.

FIG. 17 schematically shows halftone dots for the three colors C, M and Y, which are produced during step S103, as shown in FIG. 16.

The hatched areas shown in FIG. 17 are plotted areas, making up halftone dots. The non-hatched area represents the whitened areas. Each of the squares making up the hatched and non-hatched areas corresponds to one threshold of the halftone dot screen, as well as to one pixel of the image.

With the halftone dot screens and screen percentages being set for each of the colors, halftone dots whose shapes, sizes and sequences are different from each other, as shown in FIG. 17, are obtained for each of the three colors C, M and Y.

The halftone dots for each of the three colors of C, M and Y are obtained in steps S101 through S103 shown in FIG. 16. According to the halftone dot evaluating method, a maximum quantity by which the halftone dots are shifted relatively to each other due to a registration shift (maximum shift quantity) is set (step S104), and then a shift quantity within the maximum shift quantity is automatically set (step S105). In the present embodiment, shift quantities of the halftone dots for C and M colors (C, M plates) are set with respect to the halftone dots for the Y color (Y plate). For illustrative purposes, the C and M plates are shifted in vertical directions as shown in FIG. 17, with the downward direction being positive. In the present embodiment, units of the shift quantities are represented by small squares (i.e., pixels), which make up the halftone dots and the white areas, as shown in FIG. 17. According to the present invention, in order to increase the resolution of the halftone dot evaluation, it is possible to the set shift quantities to units smaller unit than one pixel unit.

After the halftone dot shapes and sizes, and the shift quantities for the halftone dots, have been obtained, an image representing a halftone dot structure, wherein the halftone dots for the three colors C, M and Y overlap each other, is generated (steps S106, S107). Specifically, an image representing a halftone dot structure having set shift quantities is generated (step S106), and an image representing a halftone dot structure having a shift quantity of "0" is generated (step S107). Area ratios of the respective colors are calculated from statistical distributions of a white color, primary colors C, M and Y (pure colors), secondary colors (R: red, Gn: green, B: blue), and a tertiary color (Gy: gray) occurring within the generated images (steps S108, S109).

FIGS. 18A and 18B show an example of a halftone dot structure, which is obtained when the shift quantity is "0". FIGS. 19A and 19B show an example of a halftone dot structure, which is obtained when the halftone dots are shifted.

The halftone dot structures shown in FIGS. 18A, 18B and FIGS. 19A, 19B are produced when the halftone dots for the three colors C, M and Y overlap each other. In FIG. 19A, the C plate is shifted one pixel downwardly from the Y plate, and the M-plate is shifted two pixels downwardly from the Y plate.

As shown in FIGS. 18A and 19A, when the halftone dots for the three colors C, M and Y overlap each other, the secondary colors R, Gn and B, as well as the tertiary color Gy, are generated in the images, in addition to the primary colors C, M and Y. The color ratios present in the images are statistically calculated, wherein such calculated results are shown in FIGS. 18B and 19B. When the halftone dots are shifted relatively to each other, due to a registration shift or the like, the ratio of the white color indicated by the field "NO PIXEL", for example, changes from 44% to 49%, whereas the ratio of the pure color magenta changes from 14% to 7%.

After the area ratios have been calculated in steps S108 and S109 in FIG. 16, spectrums of the entire halftone dot structure are calculated, by combining the color spectrums (steps S110, S111).

Figure 20:
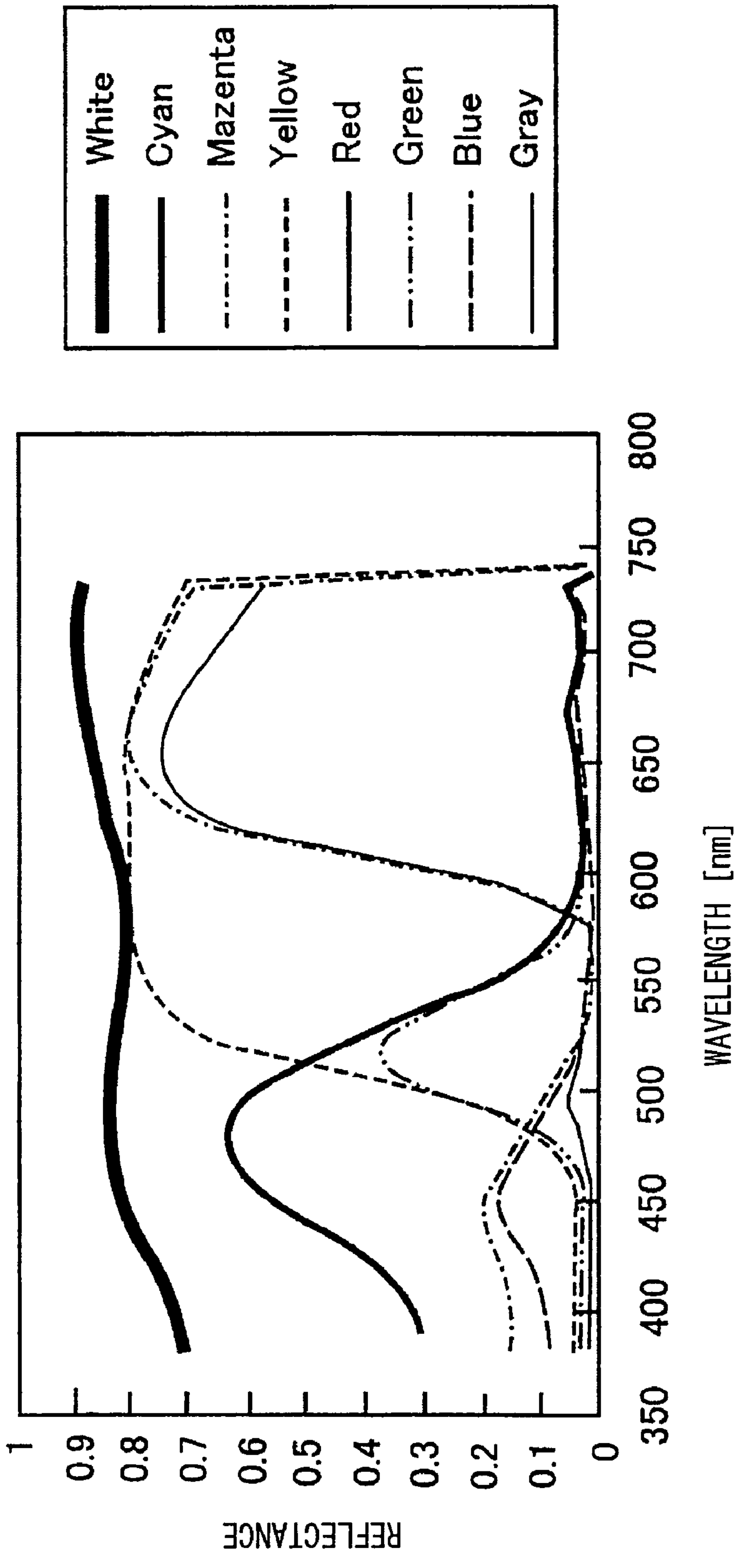
FIG. 20 is a diagram showing an example of color spectrums.

FIG. 20 shows the color spectrums, wherein the horizontal axis represents wavelength and the vertical axis represents reflectance.

FIG. 20 shows spectrums of the reflectances of the white colors, the primary colors C, M and Y, the secondary colors, and the tertiary color. Such spectrums can be obtained by measuring solid colors, which are actually output to a sheet of paper or the like. Spectrums of the respective colors are weighted by the area ratios and added to each other, thereby producing a spectrum of the entire halftone dot structure.

Figure 21:
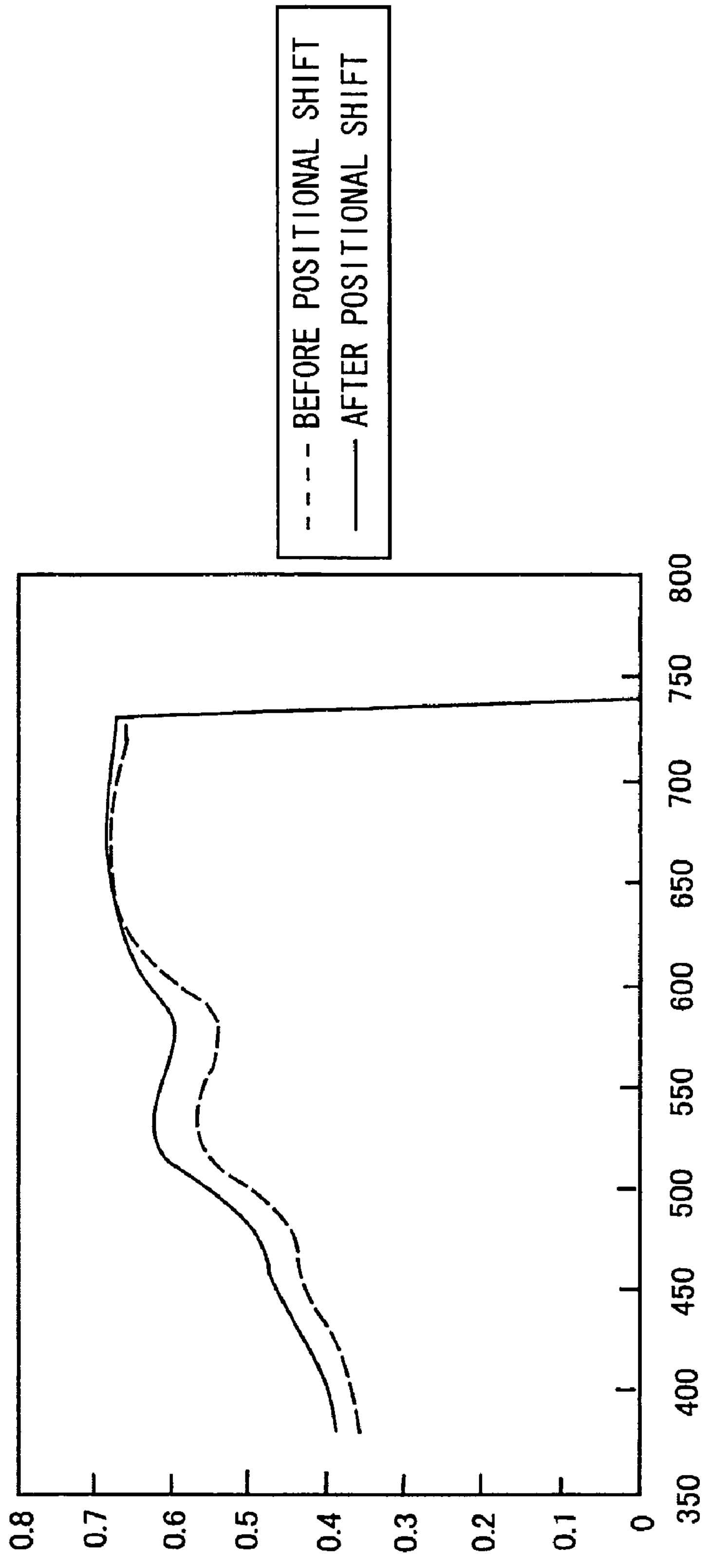
FIG. 21 is a diagram showing an example of a combined spectrum.

FIG. 21 shows an example of the combined spectrums, wherein the horizontal axis represents wavelength and the vertical axis represents reflectance.

FIG. 21 shows two spectrums. The spectrum represented by the broken-line curve is obtained when the shift quantity is "0", as shown in FIGS. 18A and 18B. The spectrum represented by the solid-line curve is obtained when the halftone dots are shifted, as shown in FIGS. 19A and 19B. A comparison of such spectrums indicates that the reflectance wavelength dependency, after the halftone dots have been shifted, is slightly changed from the reflectance wavelength dependency before the halftone dots have been shifted.

After the spectrums have been calculated in steps S110 and S111 in FIG. 16, Lab values, which serve as a colorimetric representation of the colors produced by the halftone dot structures shown in FIGS. 18A, 18B and FIGS. 19A, 19B, are calculated based on the spectrums (steps S112, S113). In order to calculate the Lab values, the spectrum of the light source employed for observing the halftone dots is used, so as to determine spectrums of the colors reflected by the halftone dot structures.

Figure 22:
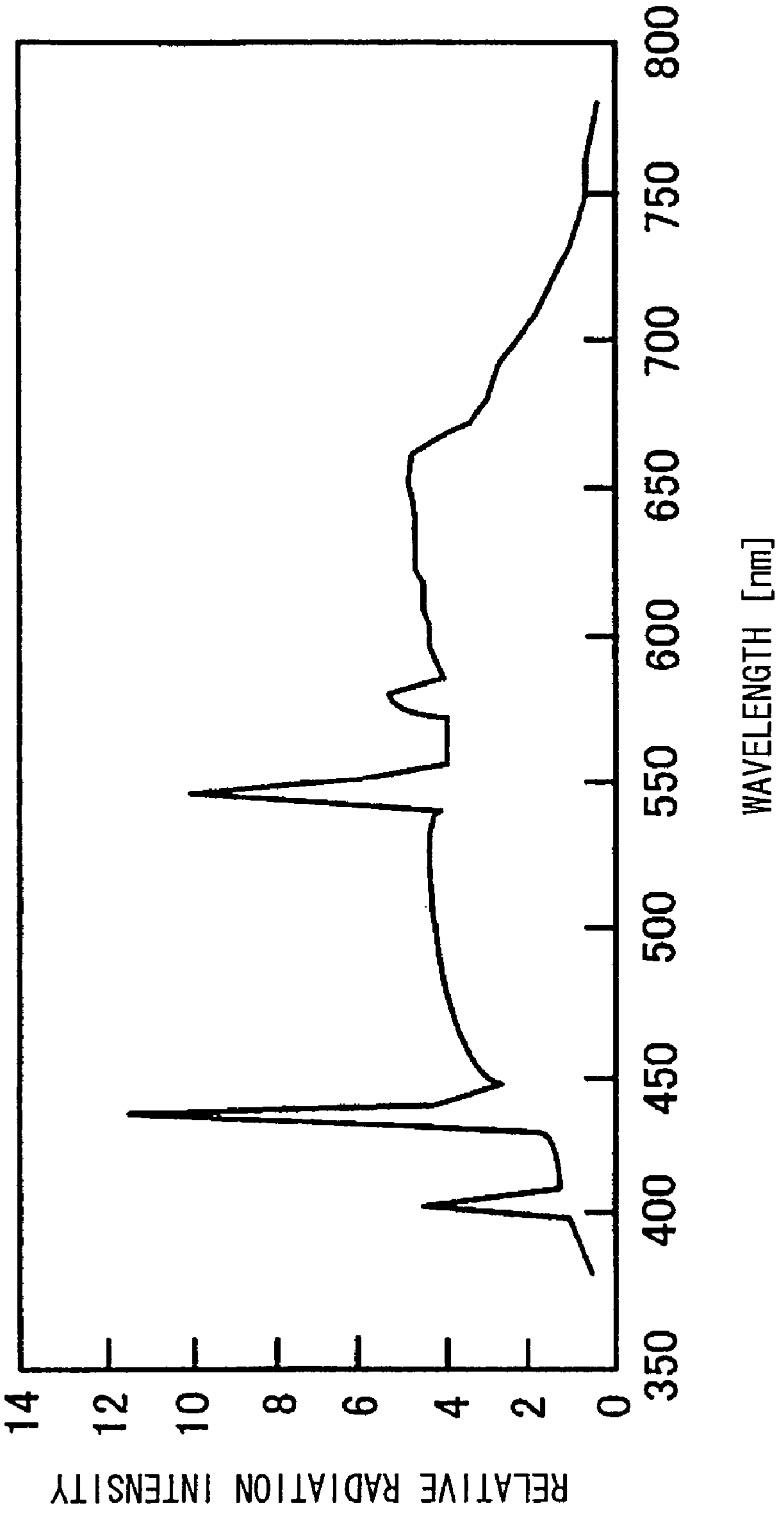
FIG. 22 is a diagram showing an example of a light source spectrum.

FIG. 22 shows an example of the light source spectrum.

As shown in FIG. 22, the spectrum of a typical light source includes a pedestal formed over a wide wavelength range and containing certain sharp peaks therein. The light source spectrum is multiplied by spectrums of reflectances, as shown in FIG. 21, in order to determine the spectrums of light reflected by the halftone dot structures.

Then, spectrums of the reflected light are multiplied by color matching functions of the tristimulus values and are integrated, thereby calculating the tristimulus values (X, Y, Z values).

Figure 23:
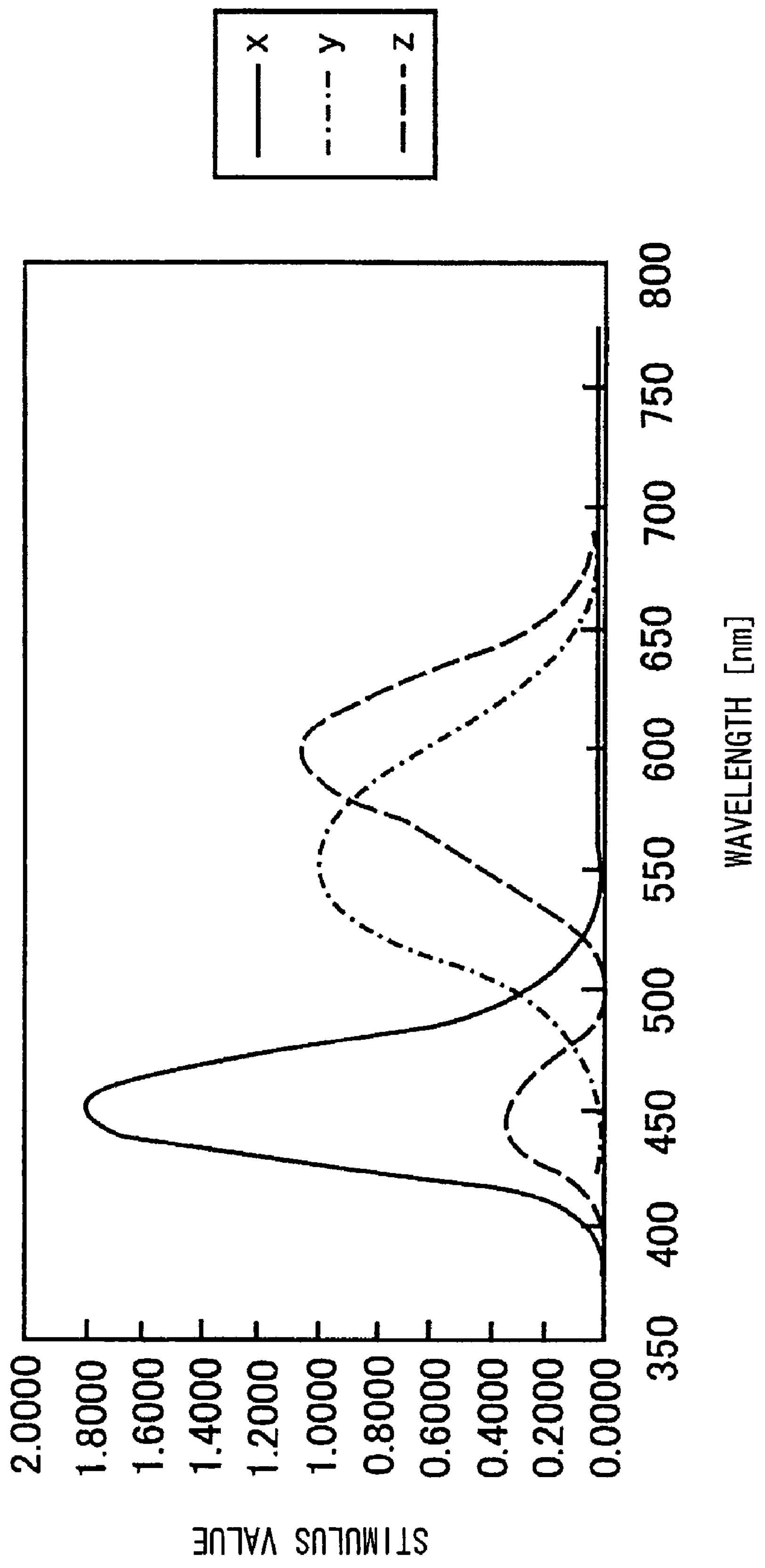
FIG. 23 is a diagram showing color matching functions of tristimulus values.

FIG. 23 shows color matching functions of the tristimulus values.

More specifically, FIG. 23 shows color matching functions of the tristimulus values (X, Y, Z values), wherein the X, Y, Z values are obtained when the color matching functions are multiplied by spectrums of the reflected light and integrated over the full wavelength range.

Finally, the X, Y, Z values thus determined are converted into Lab values, in accordance with an internationally established conversion equation. For example, the Lab values, which are finally obtained based on the spectrums shown in FIG. 21 and the light source spectrum shown in FIG. 22 are defined as follows:

(L,a,b)=(80.068058, 1.8677918, 14.667547) when there are no shift quantities; and (L,a,b)=(82.740753, −1.0719514, 14.274755) when the halftone dots are shifted.

After the Lab values have been calculated in steps S112 and S113 in FIG. 16, a color shift (i.e., a color difference ΔE) between halftone dots that are not shifted and the shifted halftone dots is calculated from the Lab values, according to equation (1):

$$\Delta E=(\Delta L^2+\Delta a^2+\Delta b^2)^{1/2} \quad (1)$$

where ΔL represents the difference of the value L, Δa represents the difference of the value a, and Δb represents the difference of the value b (step S114).

For example, a color difference ΔE=3.9924524 is calculated from the above Lab values.

Steps S105, S106, S108, S110, S112, and S114 are repeatedly executed in the above processing sequence for each of the shift quantities, which are automatically set to slightly different values in step S105. As a result, a map representing a relationship between shift quantities and color differences is generated (step S115). An example of such a map shall be described below. First, a screen set, which forms the basis for such a map, shall be described below.

Figure 24:
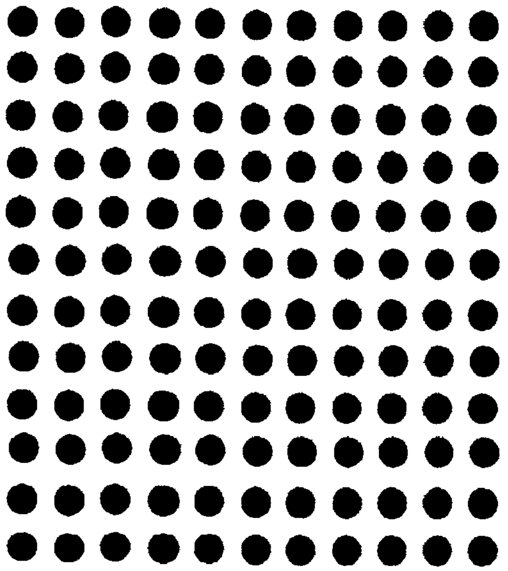
FIG. 24 is a diagram showing a screen set that serves as a basis for a map.
Figure 24:
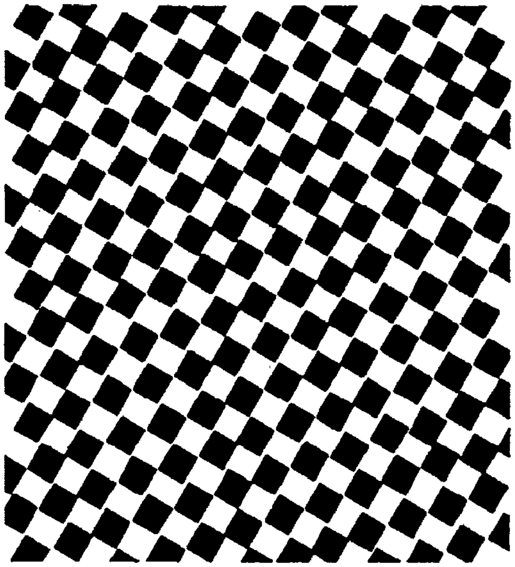
Figure 24:
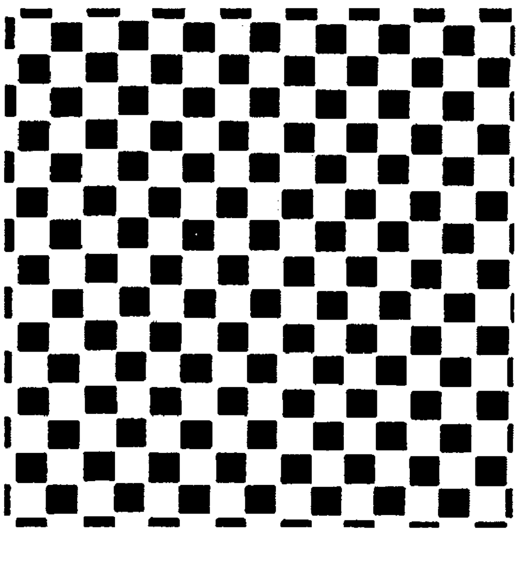
Figure 25A:
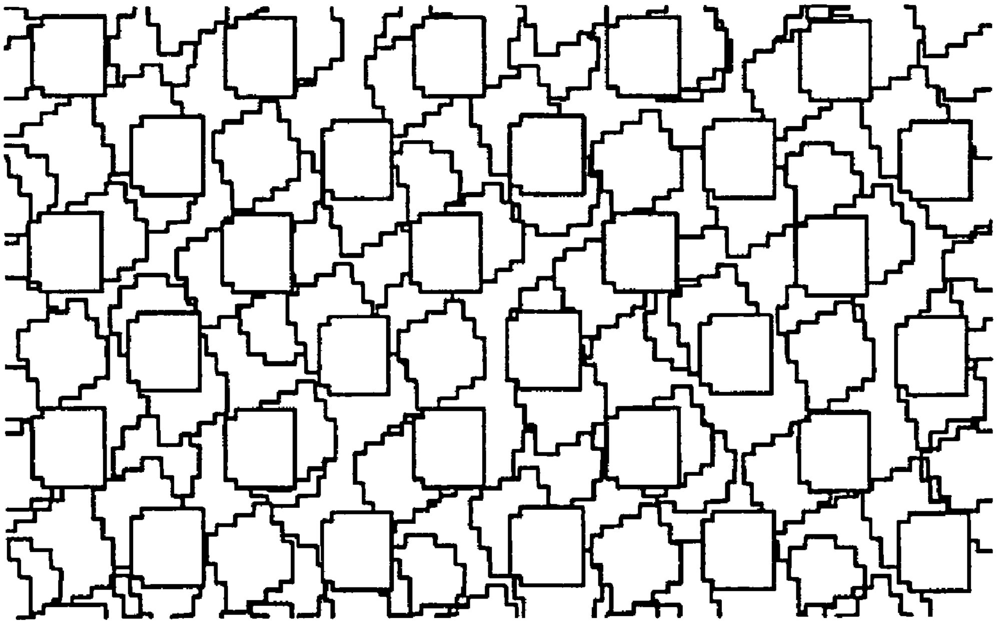
FIG. 25A is a diagram showing overlapping halftone dots in a screen set that serves as a basis for a map, with the color differences being 0.
Figure 25B:
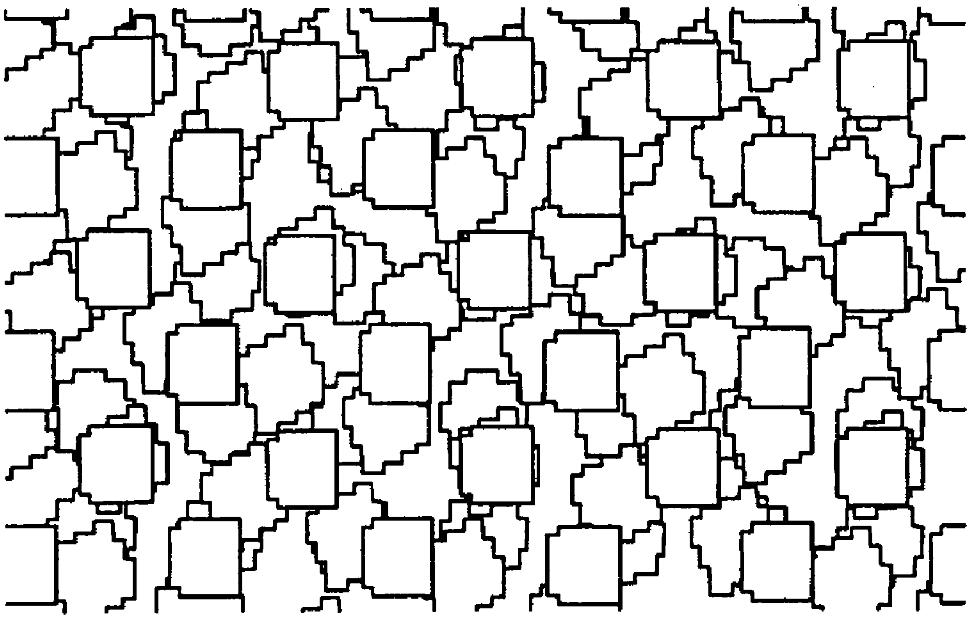
FIG. 25B is a diagram showing overlapping halftone dots in a screen set that serves as a basis for a map, with the color differences being maximum.

FIG. 24 shows a screen set, which forms the basis for the map. FIGS. 25A and 25B illustrate overlapping of halftone dots within the screen set.

FIG. 24 shows halftone dots for the three colors C, M and Y. Such halftone dots are used instead of the halftone dots schematically illustrated in FIG. 17, in order to determine a map of color differences, to be described later.

FIG. 25A shows a halftone dot structure wherein the shift quantities are "0", and FIG. 25B shows a halftone dot structure having shift quantities that maximize color differences within the map, to be described later. In FIG. 25B, the C plate is shifted one pixel upwardly, and the M plate is shifted four pixels downwardly.

Figure 26:
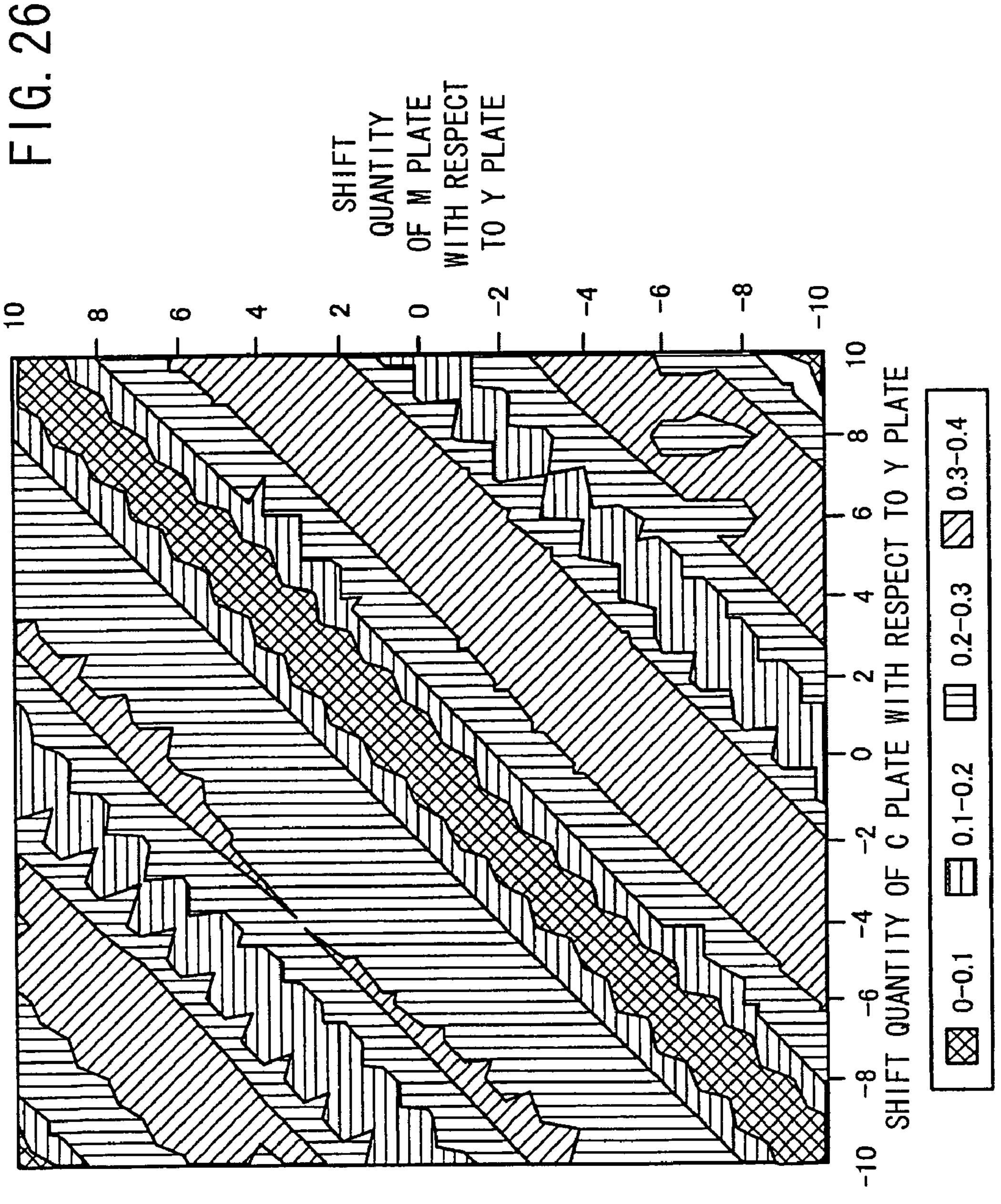
FIG. 26 is a diagram showing an example of a map made up of color differences with respect to a screen set.

FIG. 26 shows an example of a map of color differences with respect to the screen set.

The map has a horizontal axis representing the shift quantity of the C plate with respect to the Y plate, and a vertical axis representing the shift quantity of the M plate with respect to the Y plate. As can be seen from FIG. 26, there is an area exhibiting large color differences, from the lower side to the right side, with respect to the center of the map.

After the map is obtained in step S115 in FIG. 16, a maximum color difference within the map is finally calculated (step S116). In the example shown in FIG. 26, a maximum color difference is produced when the C plate is shifted +1 and the M plate is shifted −4, as described above with reference to FIG. 25B.

The individual color differences calculated in step S114, and the maximum color difference calculated in step S116, indicate the degree of color shift within a screen set, and serve as values for evaluating the screen set. Since such values directly evaluate the colors obtained by the screen set, they appropriately evaluate the stability of the colors produced when the screen set is actually used for performing printing applications and the like. In the present embodiment, furthermore, since the screen set is evaluated by color differences based on Lab values, the impression of color shift due to a registration shift or the like can be appropriately evaluated.

In the above description, for the sake of convenience, the halftone dots have been described as being shifted in a direction limited to being one-dimensional. In the position determining process and the position determining unit, two-dimensional shifts may also be determined.

In the above description, the evaluating process and the evaluator evaluate a screen set based on Lab values converted from the tristimulus values. However, the screen set may be evaluated directly by the evaluating process and the evaluator based on the tristimulus values. Such an evaluation places more emphasis on color changes in the color image produced by halftone dots than on human impression.

In the above description, the tristimulus value calculating process and the tristimulus value calculator calculate tristimulus values taking into account the light source spectrum, for example. However, if a simple evaluation is to be made, or if the observing light source is unknown, then the light source spectrum may be ignored, wherein the tristimulus values are calculated only from spectrums based on the halftone dot structures.

The above description proposed in Japanese Patent Application No. 2005-102898 concerns an evaluation of color change, or in other words, color shift (also referred to as color difference), caused by a so-called registration shift, which occurs when the halftone dots are shifted from an ideal design overlap using a screen set.

The color difference ΔE calculated by the above equation, for an instance (A) in which all of the C, M, K plates are provided as a screen set made up of rational screens, and for an instance (B) in which the C and K plates are provided as supercells but wherein the M plate is provided as a rational screen, shall be compared with each other below.

The screen ruling is 175 [LPI], and the screen percentage is 30[%] for each of the C, M, K plates.

(A) Cyan: arctan(1/3)=18.4°, size of the threshold matrix: 40×40, Magenta: arctan(1/1)=45°, size of the threshold matrix: 20×20, Black: arctan(3/1)=71.6°, size of the threshold matrix: 40×40.

Calculated result: color difference ΔE=5.3

(B) Cyan: arctan(3/11)=15.3°, size of the threshold matrix: 160×160, Magenta: arctan(1/1)=45°, size of the threshold matrix: 20×20, Black: arctan(11/3)=74.7°, size of the threshold matrix: 160×160.

Calculated result: color difference ΔE=3.2

As can be concluded from the above-calculated results, since the color difference ΔE in instance (B), where the C and K plates are formed as supercells and the M plate is formed as a rational screen, is smaller than that in instance (A), where the C, M, K plates are all formed as a screen set made up of rational screens, instance (B) is more robust against color shift caused by registration shift.

Restrictions on the size of the rational screen threshold matrix shall be described below.

If the size of the rational screen threshold matrix is 80×80 or greater, then the threshold matrix is stronger against color shift.

Specifically, if the K plate is a rational screen, robustness increases as the size of the threshold matrix increases. when the size of the threshold matrix of the K plate formed as a rational screen exceeds 80×80, the value of the color difference ΔE becomes saturated.

Further, if the size of the threshold matrix exceeds 256×256, then a rough indication of memory capacity required when selecting a memory for storing the threshold matrix exceeds 8 [bits]=256, and the size of the threshold matrix is unacceptable, since it requires an excessive memory capacity.

The color difference ΔE for specific examples (a), (b) and (c) shall be described below. In examples (a), (b) and (c), the K and Y plates are rational screens, and the C and Y plates are supercells. Example (a) has been described above with reference to FIGS. 3 through 9.

(a) Black (Yellow): arctan(1/1), the size (Nc×Nc) of the threshold matrix is 14 (=112/8)×14 (FIGS. 5, 7, 9 are plotted at a magnification of 14×8, Cyan: arctan(3/11), the size of the threshold matrix is 112×112, Magenta: arctan(11/3), the size of the threshold matrix is 112×112.

(b) Black (Yellow): arctan(2/9), the size of the threshold matrix is 85×85, Cyan: arctan(8/27), the size of the threshold matrix is 255×255, Magenta: arctan(21/19), the size of the threshold matrix is 255×225.

(c) Black (Yellow): arctan(1/9)≈23.7°, the size of the threshold matrix is 82×82, Cyan: arctan(11/25)≈54°, the size of the threshold matrix is 246×246, Magenta: arctan(11/8) ≈83.7°, the size of the threshold matrix is 123×123.

(i) The color difference ΔE when the screen percentage for the C, M, K plates is 30% (expressed as CMK=30/30/30): (a) 2.97, (b) 2.47, (c) 2.88.

(ii) The color difference ΔE when CMK=40/40/30: (a) 3.18, (b) 2.9, (c) 2.88.

(iii) The color difference ΔE when CMK=40/40/20: (a) 3.1, (b) 2.68, (c) 2.71.

(iv) The color difference ΔE when CMK=70/70/70: (a) 2.59, (b) 2.19, (c) 2.18.

It can be seen that the color difference ΔE in example (b), where the size of the threshold matrix is greater than 80×80, is greater than in example (a), where the size of the threshold matrix is smaller than 80×80, and hence example (b) is more robust.

FIG. 27 shows a table containing the values of examples (b) and (c).

Halftone dot patterns of example (c) shall be described below with reference to FIGS. 28 through 34.

Figure 28:
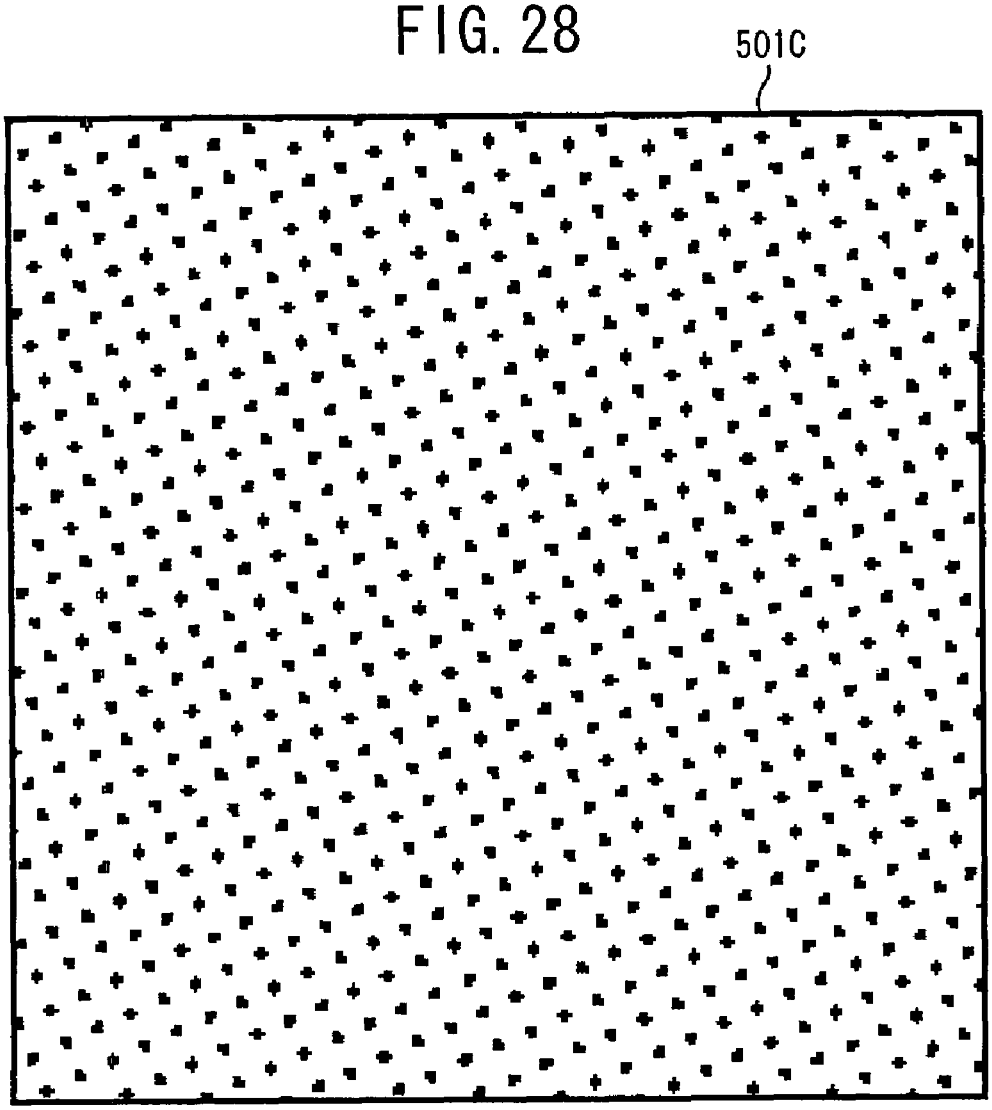
FIG. 28 is a diagram illustrating an image of a C plate halftone dot pattern of a supercell.

FIG. 28 shows a halftone dot pattern 501C of a C plate formed as a supercell.

Figure 29:
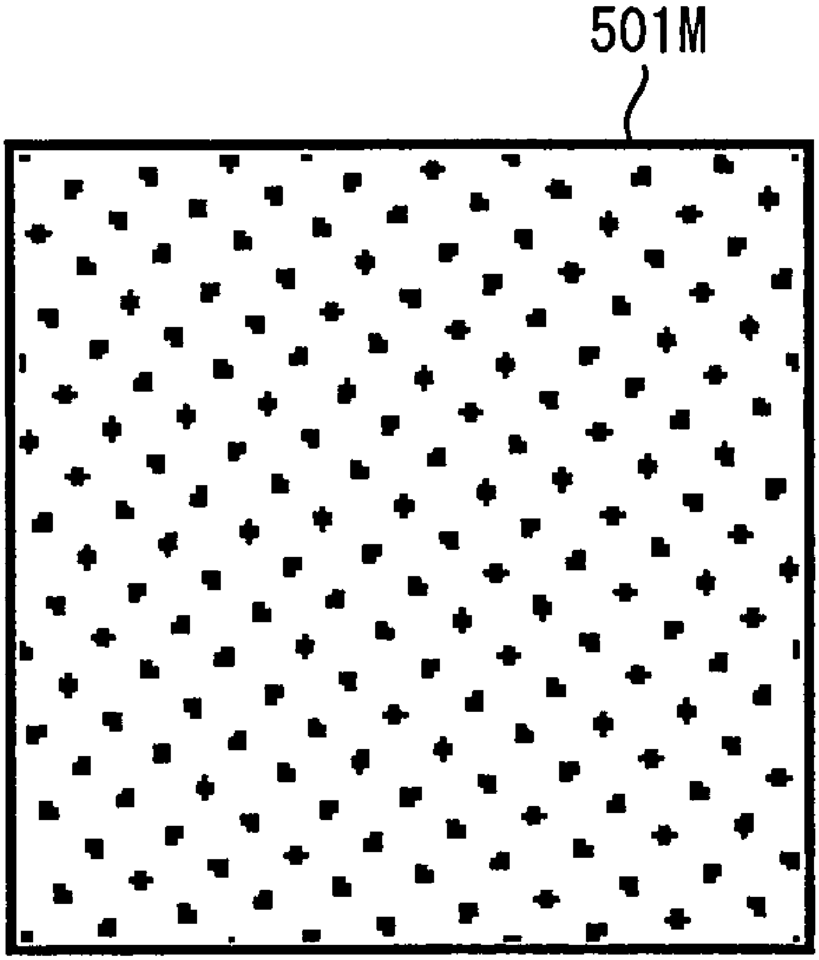
FIG. 29 is a diagram illustrating an image of an M plate halftone dot pattern of a supercell.

FIG. 29 shows a halftone dot pattern 501M of an M plate formed as a supercell.

Figure 30:
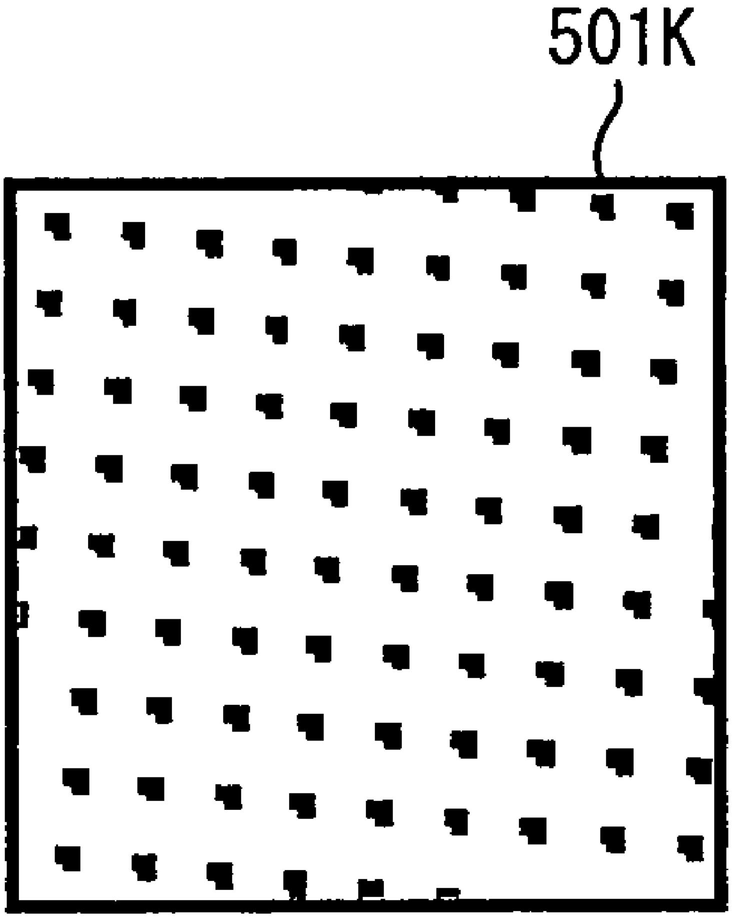
FIG. 30 is a diagram illustrating an image of a K plate halftone dot pattern of a rational screen.

FIG. 30 shows a halftone dot pattern 501K of a K plate formed as a rational screen.

Figure 31:
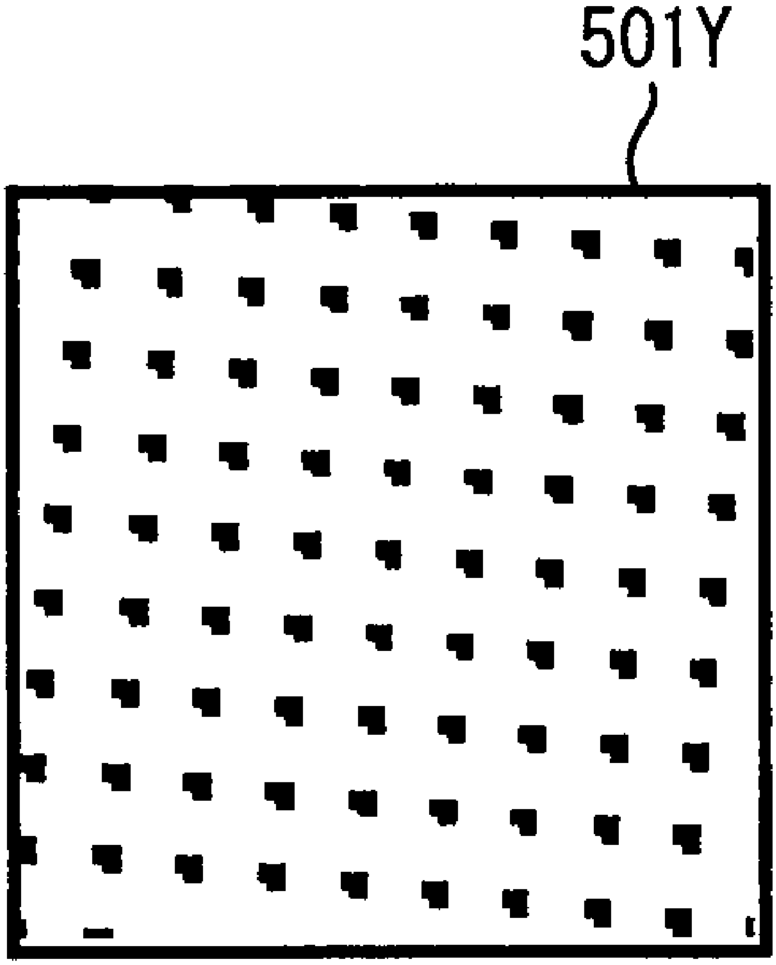
FIG. 31 is a diagram illustrating an image of a Y plate halftone dot pattern of a rational screen.

FIG. 31 shows a halftone dot pattern 501K of a Y plate, which is formed as a rational screen. The halftone dot pattern 501K of the Y plate is made up of the same rational screen as that of the halftone dot pattern 501K of the K plate shown in FIG. 30, but is shifted therefrom 180° in phase.

The halftone dot patterns 501C and 501M shown in FIGS. 28 and 29, which are formed as supercells, include halftone dots having different numbers of pixels and different shapes. However, the halftone dot patterns 501K and 501Y shown in FIGS. 30 and 31, which are formed as rational screens, include halftone dots having substantially the same numbers of pixels and shapes.

Figure 32:
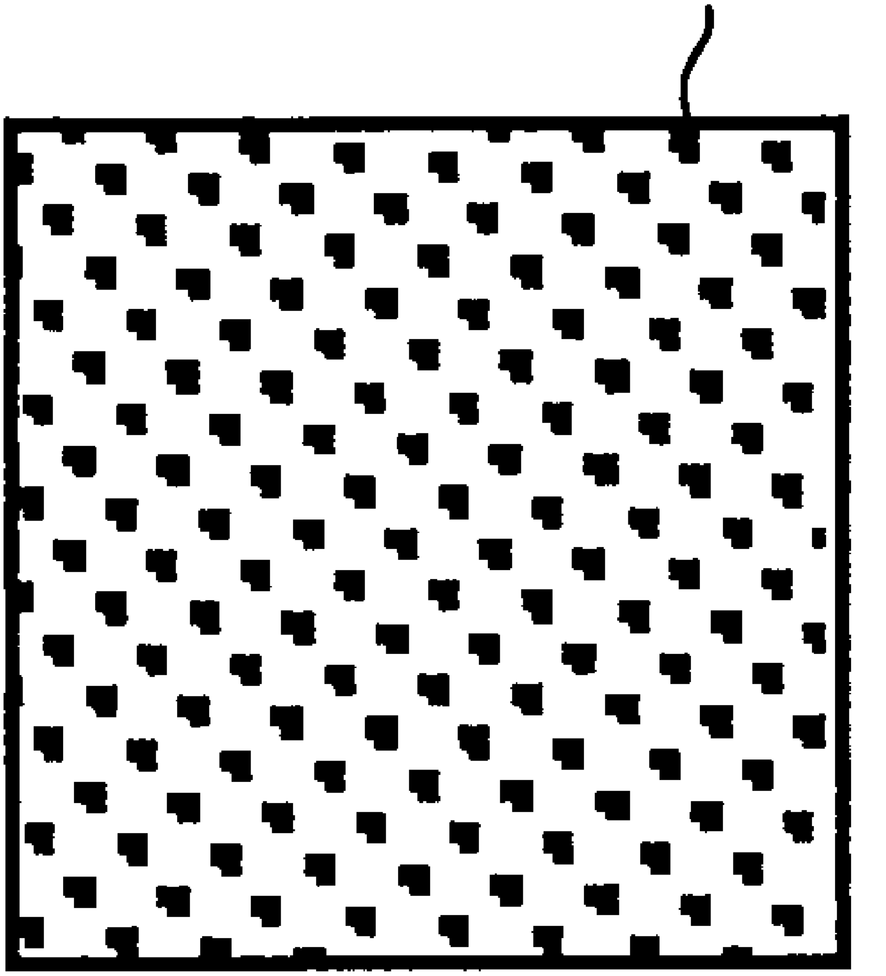
FIG. 32 is a diagram illustrating an image of a combined YK plate halftone dot pattern, which is made up of a combination of an image of a K plate halftone dot pattern and an image of a Y plate halftone dot pattern of a rational screen.

FIG. 32 shows a combined YK plate halftone dot pattern 501Syk, which is a combination of the K plate halftone dot pattern 501K shown in FIG. 30 and the Y plate halftone dot pattern 501Y shown in FIG. 31, while being shifted 180° in phase from the K plate halftone dot pattern 501K. As can be seen, in the combined YK plate halftone dot pattern 501Syk, the halftone dots of the Y and K plates are shifted 180° in phase from each other (i.e., they do not overlap each other).

Figure 33:
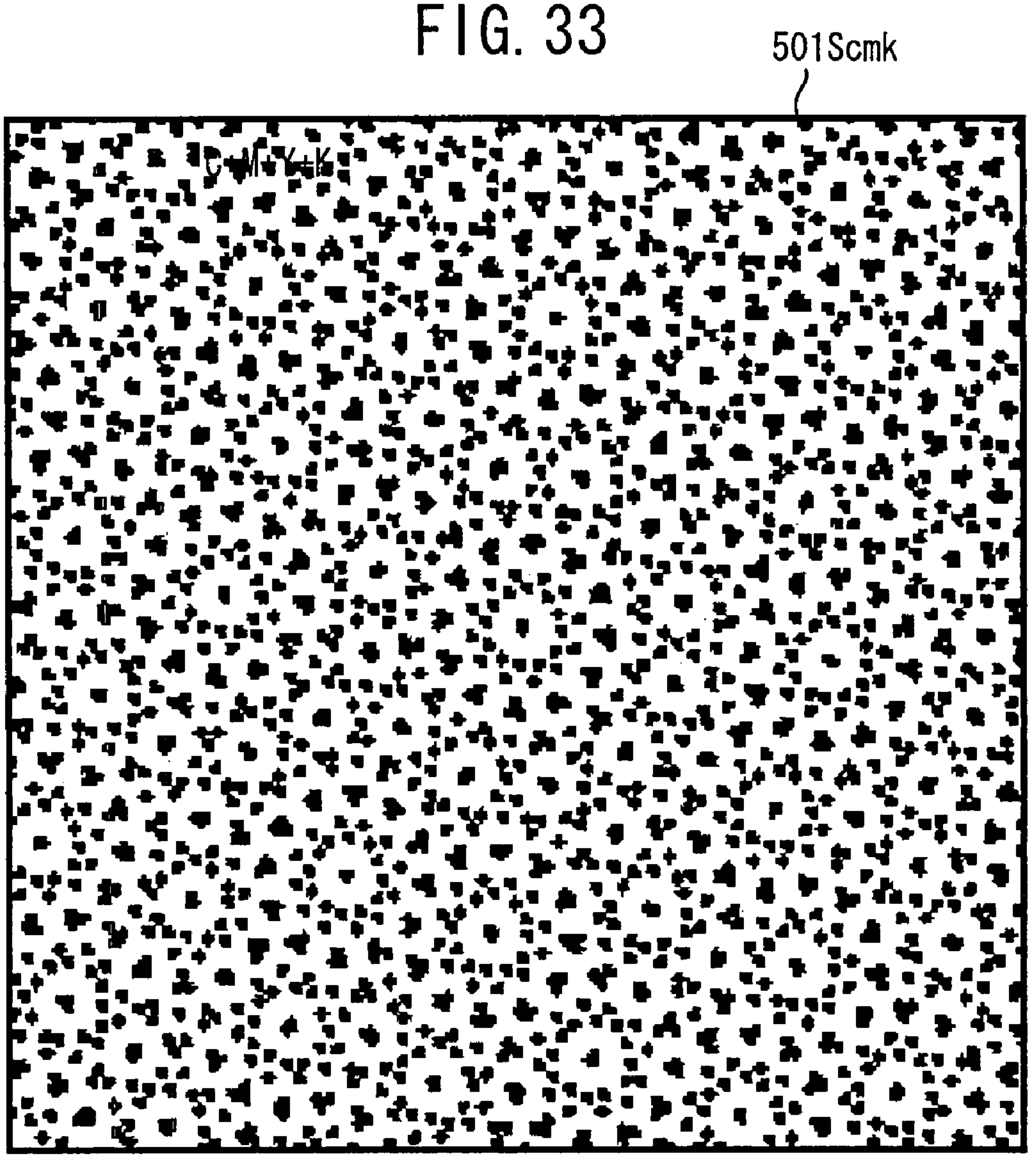
FIG. 33 is a diagram illustrating an image of a combined halftone dot pattern, which is made up of a combination of C, M, and K plate halftone dot patterns.
Figure 34:
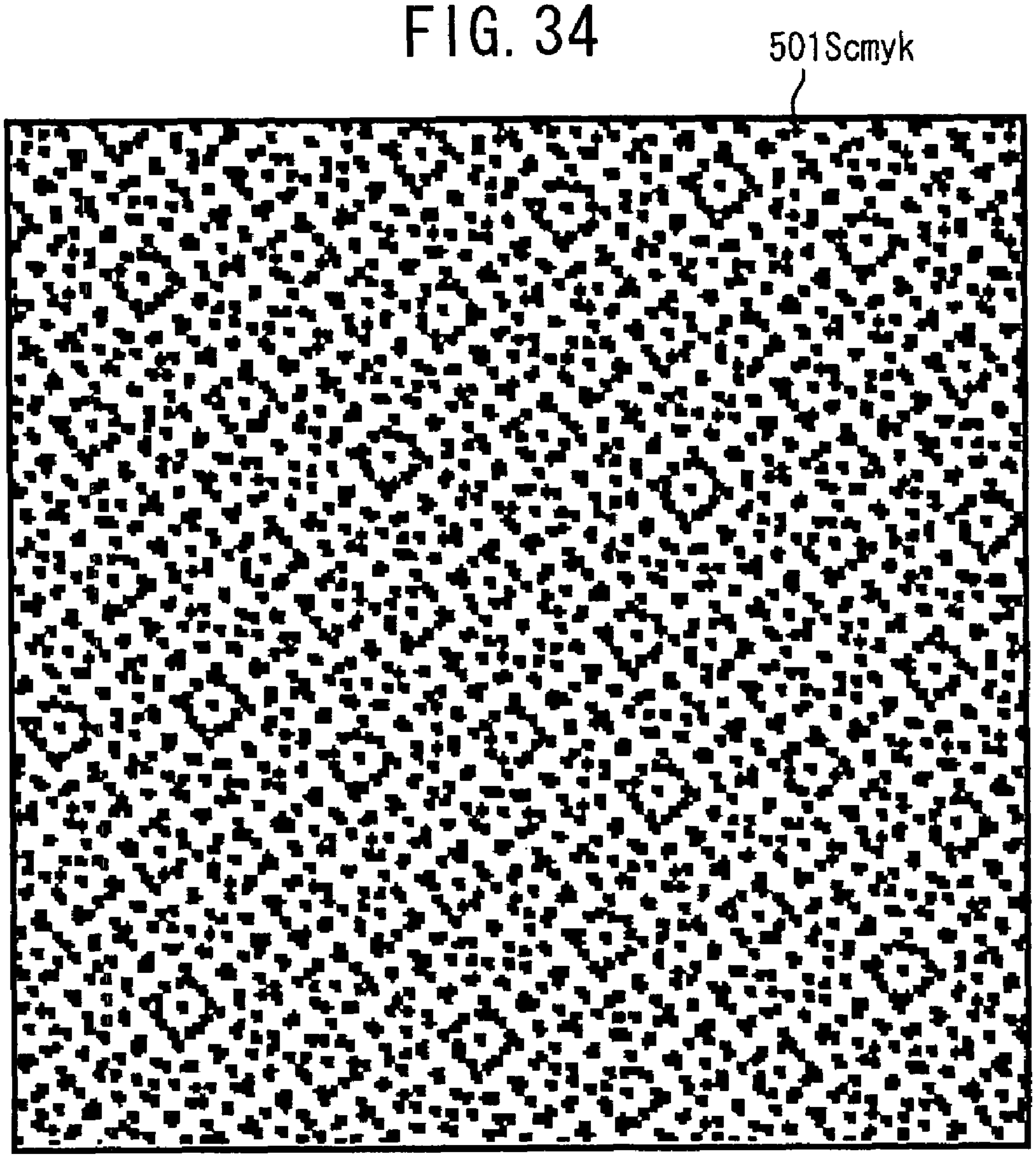
FIG. 34 is a diagram illustrating an image of a combined halftone dot pattern, which is made up of a combination of C, M, Y, and K plate halftone dot patterns.

FIG. 33 shows a combined halftone dot pattern 501Scmk, which is a combination of the halftone dot patterns 501C, 501M and 501K. FIG. 34 shows a combined halftone dot pattern 501Scmyk, which is a combination of the halftone dot patterns 501C, 501M, 501K and 501Y.

In the combined halftone dot pattern 501Scmk, since rosetta patterns are visually recognized, moiré patterns are prevented from being generated. Because the halftone dots of the K plate halftone dot pattern 501K, which is of the highest visibility, are substantially constant in shape, the factors responsible for causing stripes and irregularities due to toner deposition irregularities also are reduced.

In the combined halftone dot pattern 501Scmyk, the Y plate employs the same rational screen as that of the K plate, while being shifted in phase therefrom. Therefore, overlapping of halftone dots is reduced, and moiré patterns caused by use of a powdery toner having a large particle size (i.e., a so-called pile height moiré) are suppressed. Pile height moiré patterns can be suppressed by shifting the Y and K plates in phase, within a range from 150° to 210°.

The present invention is not limited to the above-described embodiments, but may have various other arrangements based on the descriptions provided in the present specification.

INDUSTRIAL APPLICABILITY

According to the present invention, the factors responsible for causing moiré patterns, as well as factors responsible for causing stripes and irregular patterns in color images, which tend to be generated by electrophotographic image forming apparatuses, can be minimized.

The invention claimed is:

1. An image forming method for forming a color image with at least C, M, K plates according to an electrophotographic process, comprising the steps of:

forming a K plate as a rational screen, wherein assuming a screen angle θ is expressed as $\theta=\arctan(m/n)$ where m and n are natural numbers, then a size of a threshold matrix satisfies a positive integral multiple of $m^2+n^2$;

forming C and M plates as supercells; and spacing respective screen angles of the K plate, the C plate, and the M plate at respective intervals of 30°.

2. An image forming method according to claim 1, wherein said screen angle of said K plate comprises an angle other than 0° or 45°.

3. An image forming method according to claim 1, wherein a value produced by dividing an output resolution by a ruling for each of said C, M, K plates is smaller than 12.

4. An image forming method according to claim 1, wherein said size of the threshold matrix of said K plate is within a range of from 80×80 to 256×256.

5. An image forming method according to claim 1, wherein a Y plate is added to form color images using the C, M, Y, K plates, said Y plate being formed as the same rational screen as said K plate, while being shifted in phase from said K plate.

6. An image forming method according to claim 5, wherein said Y plate is shifted in phase from said K plate within a range of from 150° to 210°.

7. An image forming method according to claim 1, wherein variations of rulings for the respective colors are set to 10 LPI or less.

8. An image forming method according to claim 1, wherein said respective screen angles of said K plate, said C plate and said M plate are spaced at respective intervals of 30°±1.5°.

9. A screen set for use in forming a color image with at least C, M, K plates according to an electrophotographic process, comprising:

a K plate formed as a rational screen, wherein assuming a screen angle θ is expressed as $\theta=\arctan(m/n)$ where m and n are natural numbers, then the size of a threshold matrix satisfies a positive integral multiple of $m^2+n^2$; and C and M plates formed as supercells, wherein respective screen angles of said K plate, said C plate and said M plate are spaced at respective intervals of 30°.

10. An image forming apparatus for forming a color image with at least C, M, K plates according to an electrophotographic process, comprising:

a K plate formed as a rational screen, wherein assuming a screen angle θ is expressed as $\theta=\arctan(m/n)$ where m and n are natural numbers, then the size of a threshold matrix satisfies a positive integral multiple of $m^2+n^2$; and C and M plates formed as supercells, wherein respective screen angles of said K plate, said C plate and said M plate are spaced at respective intervals of 30°.

* * * * *